United States Patent
Venneri

(10) Patent No.: US 10,032,528 B2
(45) Date of Patent: Jul. 24, 2018

(54) FULLY CERAMIC MICRO-ENCAPSULATED (FCM) FUEL FOR CANDUS AND OTHER REACTORS

(71) Applicant: Ultra Safe Nuclear Corporation, Los Alamos, NM (US)

(72) Inventor: Francesco Venneri, Los Alamos, NM (US)

(73) Assignee: Ultra Safe Nuclear Corporation, Los Alamos, NM (US)

(*) Notice: Subject to any disclaimer, the term of this patent is extended or adjusted under 35 U.S.C. 154(b) by 926 days.

(21) Appl. No.: 14/536,525

(22) Filed: Nov. 7, 2014

(65) Prior Publication Data

US 2015/0170767 A1 Jun. 18, 2015

Related U.S. Application Data

(60) Provisional application No. 61/901,289, filed on Nov. 7, 2013.

(51) Int. Cl.
| | |
|---|---|
| *G21C 3/00* | (2006.01) |
| *G21C 3/58* | (2006.01) |
| *G21C 3/04* | (2006.01) |
| *G21C 21/02* | (2006.01) |
| *G21C 3/62* | (2006.01) |
| *G21C 3/64* | (2006.01) |
| *G21C 3/22* | (2006.01) |

(52) U.S. Cl.
CPC ............... *G21C 3/58* (2013.01); *G21C 3/04* (2013.01); *G21C 3/623* (2013.01); *G21C 3/626* (2013.01); *G21C 3/64* (2013.01); *G21C 21/02* (2013.01); *G21C 3/22* (2013.01); *G21C 2003/045* (2013.01); *Y02E 30/38* (2013.01)

(58) Field of Classification Search
CPC ... G21C 3/00; G21C 3/02; G21C 3/04; G21C 2003/045; G21C 2003/047; G21C 2003/048; G21C 3/42; G21C 3/58; G21C 3/62; G21C 3/623; G21C 3/626; G21C 3/64
See application file for complete search history.

(56) References Cited

U.S. PATENT DOCUMENTS

| | | | | |
|---|---|---|---|---|
| 3,992,258 | A * | 11/1976 | Tobin | G21C 3/626 264/0.5 |
| 9,299,464 | B2 | 3/2016 | Venneri et al. | |
| 9,620,248 | B2 | 4/2017 | Venneri | |
| 2013/0077731 | A1* | 3/2013 | Sherwood | G21C 3/07 376/417 |

* cited by examiner

*Primary Examiner* — Marshall P O'Connor
(74) *Attorney, Agent, or Firm* — RatnerPrestia

(57) ABSTRACT

A fuel pellet for a nuclear reactor includes a plurality of tristructural-isotropic fuel particles embedded in a structural silicon carbide matrix. A method of manufacturing a fuel pellet includes the steps of coating a plurality of tristructural-isotropic fuel particles with a coating slurry including silicon carbide powder to form a plurality of coated fuel particles; compacting the plurality of fuel particles; and sintering the compacted plurality of fuel particles to form the fuel pellet.

11 Claims, 19 Drawing Sheets

FCM Fuel Fabrication

- FCM fuel is hot-pressed to form the SiC matrix around TRISO particles by a *Nano Infiltration Transient Eutectic* Phase (NITE) sintering process

- SiC nano-powder (~ 40 nm particle size) with ~5% oxide additives ($Y_2O_3+Al_2O_3$) as sintering aids

- Nanopowder allows easy "flow" and provides very high reaction surface area

- Silica present as native oxide along with the oxide additives form eutectic

- SiC Matrix density is ~98%

- Complete dispersion of oxide additives in the SiC nanopowder mixture is essential in achieving ideal microstructures

- Typical Hot-Press parameters:
  - 1 hr — Well within
  - 1850 ºC — established TRISO fuel
  - 15 MPa — compacting limits

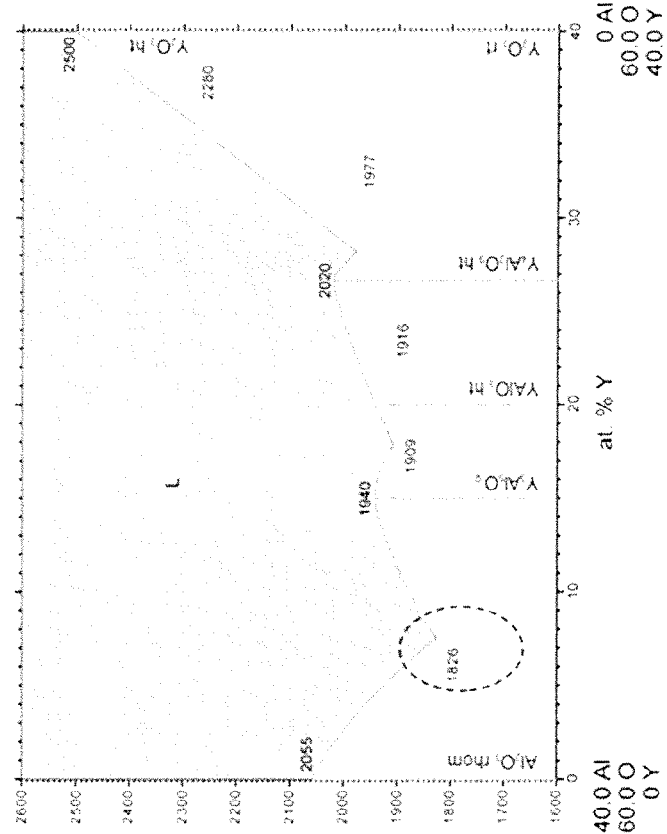

Fig. 7

|  | Solid Fuel (0.712w/o) | FCM (4.0w/o) | | FCM (5.0w/o) | |
| --- | --- | --- | --- | --- | --- |
|  |  | Mass(g) | Ratio(%) | Mass(g) | Ratio(%) |
| U-235 | 0.0763 | 0.1079 | 141.40% | 0.1349 | 176.75% |
| U-238 | 10.6408 | 2.5895 | 24.34% | 2.5625 | 24.08% |
| HM(g)/Rod | 10.7171 | 2.6974 | 25.17% | 2.6974 | 25.17% |

Fig. 10

FULLY CERAMIC MICRO-ENCAPSULATED (FCM) FUEL FOR CANDUS AND OTHER REACTORS

CROSS REFERENCE TO RELATED APPLICATIONS

This application claims the benefit and priority of U.S. Patent Application 61/901,289, entitled "FULLY CERAMIC MICRO-ENCAPSULATED (FCM) FUEL FOR CANDU REACTORS," filed Nov. 7, 2013, which is hereby incorporated by reference in its entirety.

TECHNICAL FIELD

This disclosure relates generally to nuclear technologies, and more particularly relates to fully ceramic micro-encapsulated fuel assembly with reactivity characters that are comparable to a standard reference reactor fuel for CANDU reactors and other reactors.

BACKGROUND

Nuclear fuel undergoes fission to produce energy in a nuclear reactor, and is a very high-density energy source. Solid pellets of oxide fuels such as uranium dioxide are commonly used in today's reactors because they are relatively simple and inexpensive to manufacture, can achieve high effective uranium densities and have a high melting point. They also provide well-established pathways to reprocessing. For example, solid uranium dioxide ("$UO_2$") is widely used in CANada Deuterium Uranium ("CANDU") reactor and other reactors. To be used as a fuel, uranium dioxide is compacted into cylindrical pellets and sintered at high temperatures to produce ceramic nuclear fuel pellets with a high density. Such fuel pellets are then stacked into metallic tubes ("cladding"). Cladding prevents radioactive fission fragments from escaping from the fuel into the coolant and contaminating it. The metal used for the tubes depends on the design of the reactor. Stainless steel was used in the past, but most reactors now use a zirconium alloy which, in addition to being highly corrosion-resistant, has low neutron absorption.

The sealed tubes containing the fuel pellets are termed fuel rods, which are grouped into fuel assemblies used to build up the core of a nuclear power reactor. Each fuel assembly includes fuel rods bundled in an arrangement of 16×16 or 17×17 in current Pressurized Water Reactors ("PWRs") depending on the reactor core design. A reactor core includes multiple fuel assemblies, such as 400 to 800 fuel assemblies. In CANDU reactors the fuel rods are arranged in cylindrical canisters, each containing 20-40 short fuel rods depending on the design. There are hundreds of canisters lined up in tubes with coolant and moderator and they are moved in and out of the reactor at a predetermined rate.

Tristructural-isotropic ("TRISO") fuel particles compacted within a graphite matrix have been developed for a new generation of gas-cooled reactors. A TRISO fuel particle comprises a kernel of fissile/fertile material coated with several isotropic layers of pyrolytic carbon ("PyC") and silicon carbide ("SiC"). These TRISO particles are combined with a graphite matrix material and pressed into a specific shape. The TRISO fuel forms offer much better fission product retention at higher temperatures and burnup than metallic or solid oxide fuel forms.

Burnup is a measure of how much energy is extracted from a nuclear fuel source. It is measured as the fraction of fuel atoms that underwent fission in fissions per initial metal atom ("FIMA"). Burnup is also measured as the actual energy released per mass of initial fuel in, for example, megawatt-days/kilogram of heavy metal ("MWd/kgHM"). Higher burnup may not only reduce the overall waste volume but also limit possible nuclear proliferation and diversion opportunities. While high burnup is desirable, it is also important that burnup rates for the replacement TRISO based fuel should be not too fast and should at least match the burnup rate of the reference standard fuel, in order to achieve comparable service life in the reactor.

Recently, the fully ceramic micro-encapsulated ("FCM") fuel has been proposed, wherein FCM fuel utilizes TRISO fuel particles, which are pressed into compacts using SiC matrix material and loaded into fuel pins. However, the heavy metal mass in a FCM fuel pellet tends to be considerably lower than that of a conventional solid fuel pellet due to the limited space available for heavy metal and fissile mass inside TRISO particles of FCM fuel. The heavy metal and fissile mass in a FCM fuel pellet can be increased, by increasing the diameter of the FCM fuel pellet or the kernel diameter ("KD") of TRISO particles within the FCM fuel pellet or the packing fraction of the TRISO particles, or using a high density material in the kernel, such as Uranium Nitride or Uranium Silicide. Under the first approach, for example, 12×12 FCM fuel assemblies replace conventional 16×16 solid fuel assemblies and 13×13 FCM fuel assemblies replace conventional 17×17 solid fuel assemblies. Under the latter approach, the kernel diameter of TRISO particles can be increased to, for example, 400 µm, 500 µm, 600 µm, 700 µm, or 800 µm.

The reactivity characteristics of a FCM fuel replacement assembly depends on the type(s) of material and enrichment comprising the kernel of TRISO particles. Accordingly, there exists a need for a FCM fuel assembly to achieve reactivity characteristics that are comparable to or better than that of a standard reference reactor fuel assembly, such as the widely used solid $UO_2$ assembly.

OBJECTS OF THE DISCLOSED SYSTEM, METHOD AND APPARATUS

An object of the tristructural-isotropic ("TRISO") particles is to provide greater safety during operations and in accident situations, relative to standard reference fuels;

An object of the TRISO particles is to provide comparable reactivity characteristics to standard reference fuel assemblies;

An object of the fully ceramic micro-encapsulated fuel assembly is to provide compatibility with the standard reference fuel assembly used in current CANDUs and other reactors by matching neutronics thermo-hydraulics operational parameters, such as reactivity coefficients, heat generation, heat transfer and pressure drop.

An object of the fully ceramic micro-encapsulated fuel assembly is to lower initial excess reactivity using a burnable poison;

An object of the fully ceramic micro-encapsulated fuel assembly and TRISO particles is to slow down and extend the burnup for the fully ceramic micro-encapsulated fuel assembly;

Other advantages of the disclosed fully ceramic micro-encapsulated fuel assembly and TRISO particles will be clear to a person of ordinary skill in the art. It should be understood, however, that a system, method, or apparatus could practice the disclosed fully ceramic micro-encapsulated fuel assembly and fully ceramic micro-encapsulated fuel pellet while not achieving all of the enumerated advantages, and that the fully ceramic micro-encapsulated fuel assembly and TRISO particles are defined by the claims.

SUMMARY

In one aspect of the invention, a fully ceramic micro-encapsulated fuel for CANDU reactors and other reactors, where the uranium oxide pellets are replaced with TRISO particle fuel compacted in Silicon Carbide (SiC) of similar dimensions ("FCM fuel") is disclosed. The fissile content of the FCM fuel can be enriched uranium, plutonium or other fissile materials in the form of Oxide, OxyCarbide, Carbide, Nitride, or other suitable material that can be shaped in the form of a kernel and surrounded by the multiple layers that are typical of TRISO coated particle fuel. In order to compensate for the higher reactivity of the FCM fuel relative to the natural uranium or very low enrichment fuel typical of CANDUs, and to obtain a comparable and compatible flat reactivity curve, a mixture of two or more burnable poisons (BP) is used; with at least one short-acting (larger cross section) BP and at least one long-acting (smaller cross section) BP. The BPs can be selected from the group consisting of Gadolinium, Erbium, and Boron. Other high absorption cross section materials may be used as BPs BPs.

In yet another aspect of the invention, an FCM fuel appropriate for CANDUs and other on-line refueling reactors that require relatively flat reactivity profiles, and extendable to any nuclear reactor to compensate for excess reactivity introduced by higher enrichments is disclosed.

In still another aspect of the invention, a fuel pellet comprising a plurality of tristructural-isotropic (TRISO) fuel particles, wherein each of the TRISO fuel particle is coated with a layer of SiC is disclosed. In one embodiment, each of the TRISO fuel particle in the fuel pellet is separated by a layer of SiC such that substantially each TRISO fuel particle is separated from the other by a layer of SiC. In another embodiment, each of the TRISO fuel particle in the fuel pellet is separated by a layer of SiC such that each TRISO fuel particle is separated from the other by a layer of SiC.

In still another aspect of the invention, a fully ceramic micro-encapsulated (FCM) fuel assembly for a nuclear reactor is disclosed, wherein the metal or ceramic clad fuel pin of the fuel assembly comprises the fuel pellets as disclosed herein. By utilizing highly compacted SiC matrix in the shape of a fuel pellet, the potential failure of the fuel with neutron irradiation is decreased in addition to resulting in decreased fuel-clad interaction. The SiC matrix decreases damage of clad and decreases radioactive fuel material to be dispersed in the water coolant. In addition, the SiC matrix increases the strength of TRISO particles and keeps fission products from reaching the clad.

In still another aspect of the invention, an FCM fuel pellet as disclosed herein comprises a uniform and cohesive SiC matrix surrounding each TRISO particle; wherein the SiC matrix provides a strong structural frame in which the TRISO particle resides. The SiC matrix surrounding each TRISO particle provides a strong structural component around each TRISO particle, and prevents the particles in the pellet from touching, or contacting, each other when placed in a clad. It is important to note that the purpose of the SiC matrix is not to serve as an adhesive to glue (or stick) the TRISO particles together as is the case for the carbonaceous matrix of ordinary TRISO fuel compacts. The purpose of the SiC matrix is to exert pressure on the TRISO particles, and to prevent deterioration and damage of the particle during high fluence neutron irradiation as it is to be expected in Light Water Reactors and CANDU reactors. As such, in one embodiment, with a thick coating of SiC around each TRISO particle, the plurality of TRISO particles in the pellet do not come in contact with each other and the SiC matrix can exert uniform pressure on the TRISO particles and provide the structural frame for the pellet.

In still another aspect of the invention, a method of manufacturing a fuel pellet as disclosed herein comprises overcoating, wherein each TRISO particle is coated with a slurry of SiC forming a thick layer (or coat) of SiC around the TRISO particle. By overcoat, it is meant that the slurry of SiC forms a coating about the TRISO particle in addition to the pre-existing SiC layer of the TRISO particle. In one embodiment, the plurality of TRISO particles thus obtained, each surrounded by the SiC overcoat, are placed in a mold followed by a process of compression under high pressure and temperature to eliminate the void present between each SiC coated TRISO particle. This process of sintering solidifies the compact into a structurally strong component comprising the very hard, uniformly dense SiC matrix completely surrounding the plurality of TRISO particles. In one embodiment, a fuel pellet obtained by the above method is disclosed.

In still another aspect of the invention, the method of manufacturing a fuel pellet as disclosed herein comprises the steps of coating a plurality of TRISO fuel particles with silicon carbide to form a plurality of coated fuel particles; compacting the plurality of fuel particles; and sintering the compacted plurality of fuel particles to form the fuel pellet. In one embodiment, a fuel pellet obtained by the above method is disclosed.

In still another aspect of the invention, an FCM pellet comprising a highly compacted SiC matrix surrounding TRISO particles and two or more burnable poisons is disclosed. In one embodiment, the fuel pellet comprises a plurality of TRISO particles, wherein each of the plurality of the TRISO particles is coated with SiC layer comprising the burnable poisons.

In still another aspect of the invention, an FCM pellet comprising burnable poisons that are introduced as fabricated coated particles, for example bi-isotropic ("BISO") particles, containing them is disclosed. In an FCM fuel disclosed, the burnable poisons are introduced as fabricated coated particles containing them and mixing with the TRISO fuel particles.

In still another aspect of the invention, a method of introducing a fully ceramic micro-encapsulated (FCM) fuel assembly comprising tristructural-isotropic (TRISO) particle fuel compacted in dense Silicon Carbide (SiC) matrix in a nuclear reactor is disclosed. The method includes arranging the FCM fuel assembly in a metal or ceramic clad fuel pin of the nuclear reactor.

In still another embodiment, a method of introducing burnable poisons in a nuclear reactor is disclosed. The method includes mixing oxide powders of two or more burnable poisons with Silicon Carbide (SiC) powder during sintering is disclosed.

In still another aspect of the invention, a method of introducing burnable poisons in a nuclear reactor is disclosed. In one embodiment, the method includes mixing oxide powders of two or more burnable poisons with Silicon Carbide (SiC) powder at the time of sintering. In another embodiment, the method includes introducing the burnable poisons by mixing fabricated coated particles comprising the burnable poisons with TRISO particle fuel compacted in Silicon Carbide (SiC) matrix.

In yet another aspect of the invention, a method of introducing the fully ceramic micro-encapsulated (FCM) fuel pellets in a nuclear reactor is disclosed. In one embodiment, the method comprises arranging the FCM fuel pellets as disclosed herein in a metal or ceramic clad fuel pin of the nuclear reactor and bundling the fuel pins in fuel assemblies (such as Light Water Reactors) or fuel canisters (such as in CANDU reactors).

It is to be understood that both the foregoing general description and the following detailed description are exemplary, but are not restrictive, of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 10 is a table illustrating the comparison of the fuel mass in a single fuel pin per unit;

DETAILED DESCRIPTION

Aspects of the present invention relate to nuclear fuel pellets, methods of manufacturing nuclear fuel pellets, and methods of introducing nuclear fuel pellets into a nuclear reactor.

An FCM fuel, wherein the uranium oxide pellets are replaced with TRISO particle fuel compacted in silicon carbide ("SiC") matrix of similar dimension is described herein.

Figure 6:
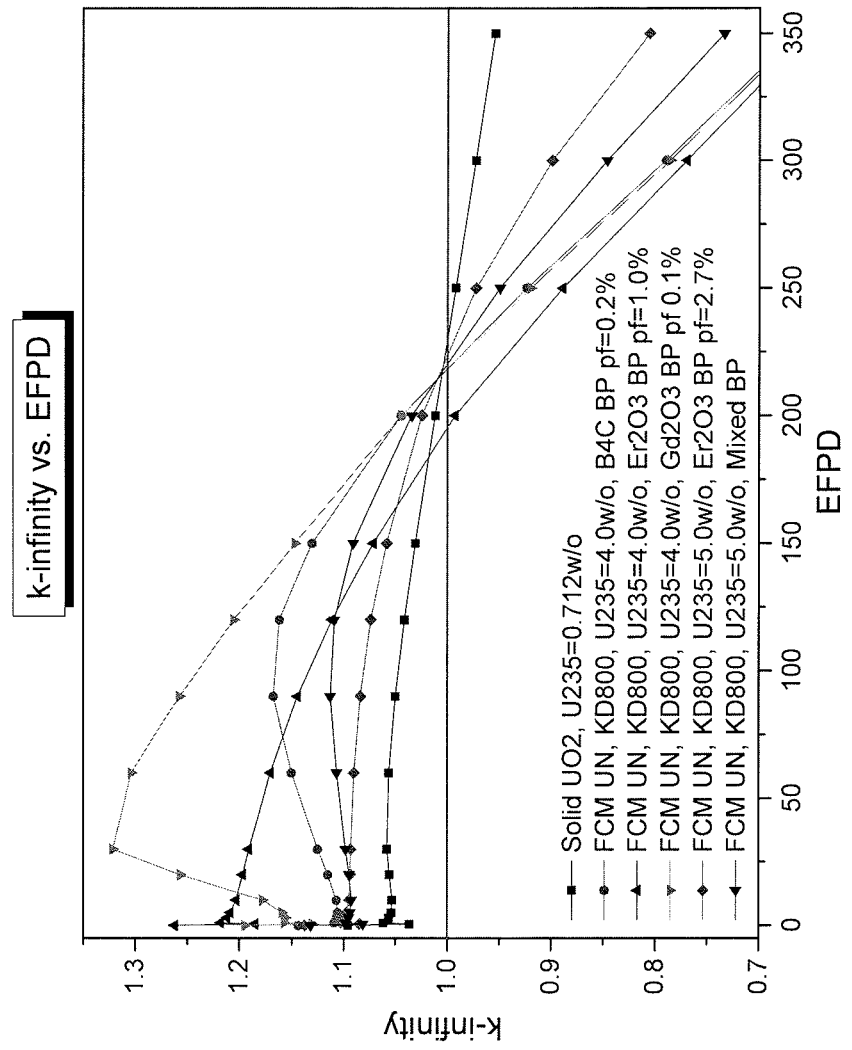
FIG. 6 is a graph illustrating the correlation between the k-infinity multiplication factor and effective full-power days for a standard reference fuel and various FCM UN fuel arrangements with different burnable poisons in accordance with this disclosure.

In one embodiment, the SiC matrix comprises two or more burnable poisons. The two or more burnable poisons comprise at least one short-acting burnable poison and at least one long-acting burnable poison, and can be selected from the group consisting of Gadolinium, Erbium, and Boron. The integrity of the SiC matrix is increased by addition of the at least two burnable poisons, which decreased spikes in reactivity. In another embodiment, the burnable poisons include Gadolinium and Erbium simultaneously in the FCM fuel. Preferably, the short-acting burnable poison, Gadolinium oxide ($GD_2O_3$), and the long-acting burnable poison, Erbium oxide ($Er_2O_3$), are used. In the presence of both burnable poisons, the reactivity curve was flattened as illustrated in FIG. 6. Gadolinium and Erbium affect the reactivity of the fuel in different and complementary ways. Gadolinium depresses the initial reactivity very strongly at the beginning stages of operations because of its very large neutron absorption cross section, and will be depleted quickly, whereas Erbium has less strong but more prolonged effect because of its smaller absorption cross section. This resulted in a relatively flat reactivity curve vs. time, and extended the Effective Full Power Days (EFPDs) relative to normal fuel.

The burnable poisons can also be introduced as fabricated coated particles containing them and mixing with the TRISO fuel particles. The fabricated coated particles can include, for example, bi-structural isotropic (BISO) containing the burnable poisons. The In one embodiment, a combination SiC matrix comprising mixing Erbium and Gadolinium is disclosed. Boron can also be used in coated particle form. In one embodiment, the analysis of a typical 37-element CANDU fuel bundle (BRUCE-37) revealed that a combination of Gadolinium and Erbium oxides, when used with current 5% enriched uranium, provided a reactivity behavior suitable for use in current CANDUs and an operationally useful life for the fuel bundle of nearly 350 days, which is roughly double the life (EFPDs) of current CANDU fuel. This will have significant impact on the economics of CANDUs, including the production of smaller amount of spent fuel waste.

Figure 1A:
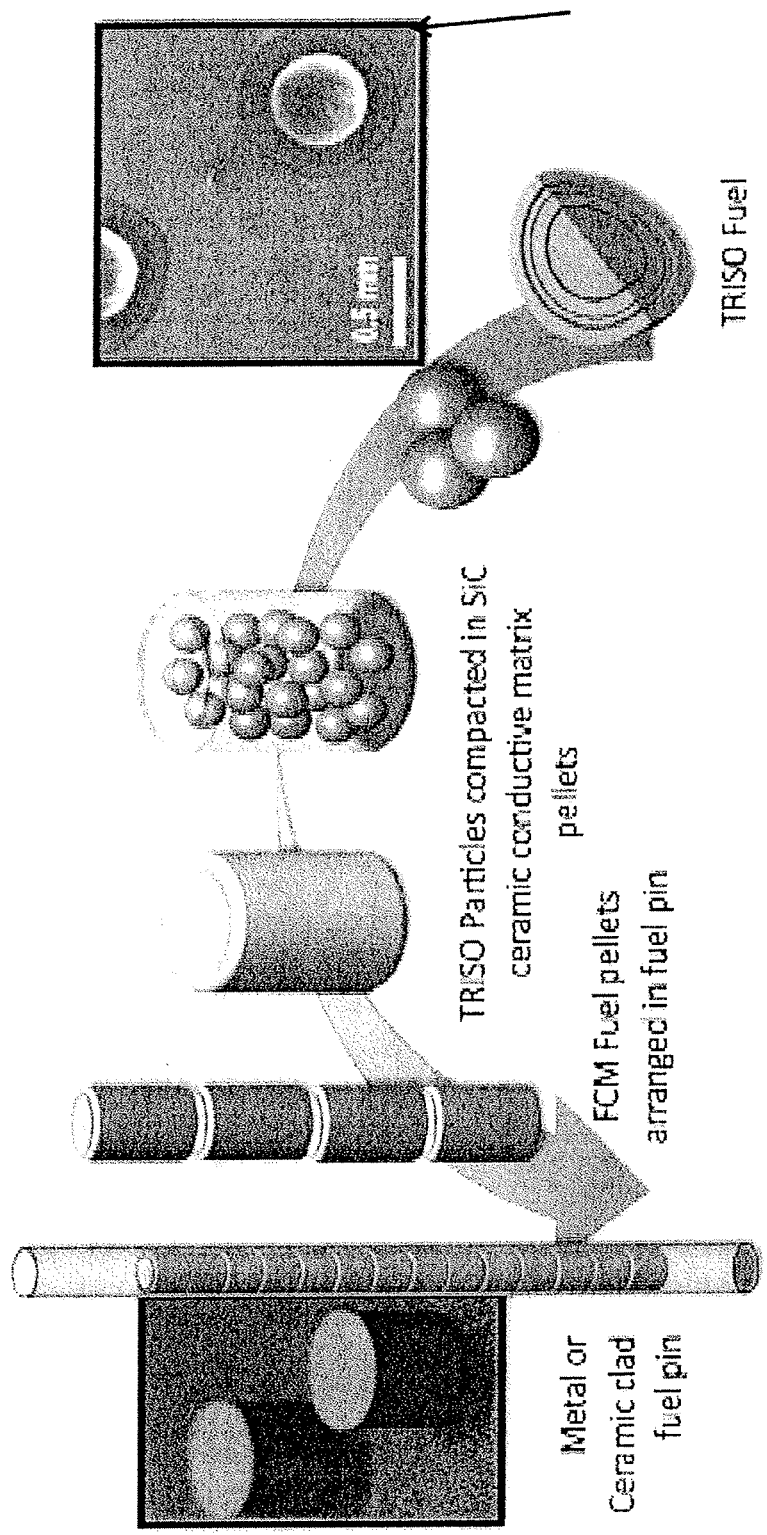
FIG. 1A provides a general description of FCM fuel.

Turning FIG. 1a, a general description of the TRISO-based FCM fuel obtained by replacing Carbon with SiC as the compact matrix is provided. A TRISO particle is a micro-fuel particle or kernel composed of fissile UN, UC, or UCO coated with four layers of three isotropic materials. The four layers typically include a porous buffer layer made of carbon, a dense inner layer of pyrolytic carbon (PyC), a ceramic layer of SiC to retain fission products at elevated temperatures, and dense outer layer of PyC.

In one embodiment, the fuel pellet as disclosed herein is manufactured by replacing carbon with SiC at the time of placing the TRISO fuel particles in a mold followed by a process of compression under high pressure and temperature to eliminate the void present between each SiC coated TRISO particle.

Figure 1B:
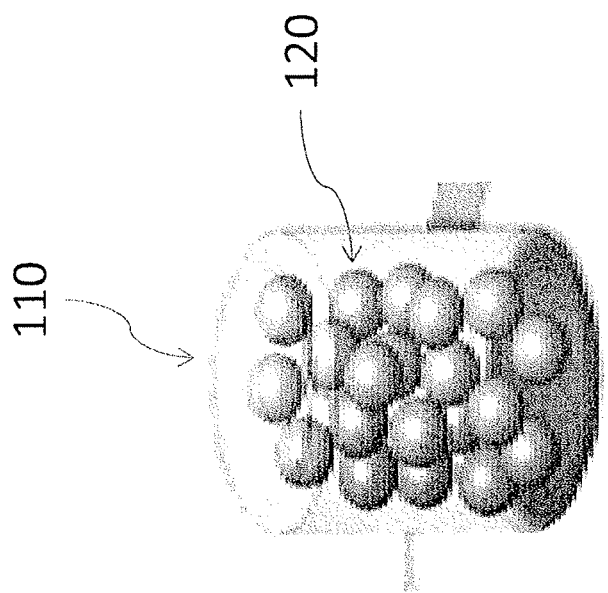
FIG. 1B depicts a fuel pellet in accordance with this disclosure.

FIG. 1b depicts a fuel pellet 100 according to aspects of the present invention. Fuel pellet 100 includes a plurality of TRISO fuel particles 120 embedded in a SiC matrix 110. The plurality of TRISO fuel particles 120 are coated in SiC such that substantially all TRISO fuel particles are separated from each other by SiC. The coating layer can, as described above, contain one or more burnable poisons.

Processing of SiC into dense shapes can be done on an industrial scale at a reasonable cost, such as Nano-powder Infiltration and Transient Eutectoid (NITE) process. Once compacted into the SiC matrix, the FCM fuel pellets can be inserted into standard CANDU compatible clads and assembled into standard fuel bundles (canisters). The clad is comprised of a very thin Zr-alloy, Stainless Steel or SiC. All licensed CANDU fuel bundle geometries can be used with the FCM fuel, including the new CANFLEX. The FCM fuel does not crack under irradiation and does not release fission gases, and does not interact with the clad, therefore gapless fuel elements and collapsible fuel clads can be used. A gas plenum may or may not be provided in the fuel rod.

Figure 2:
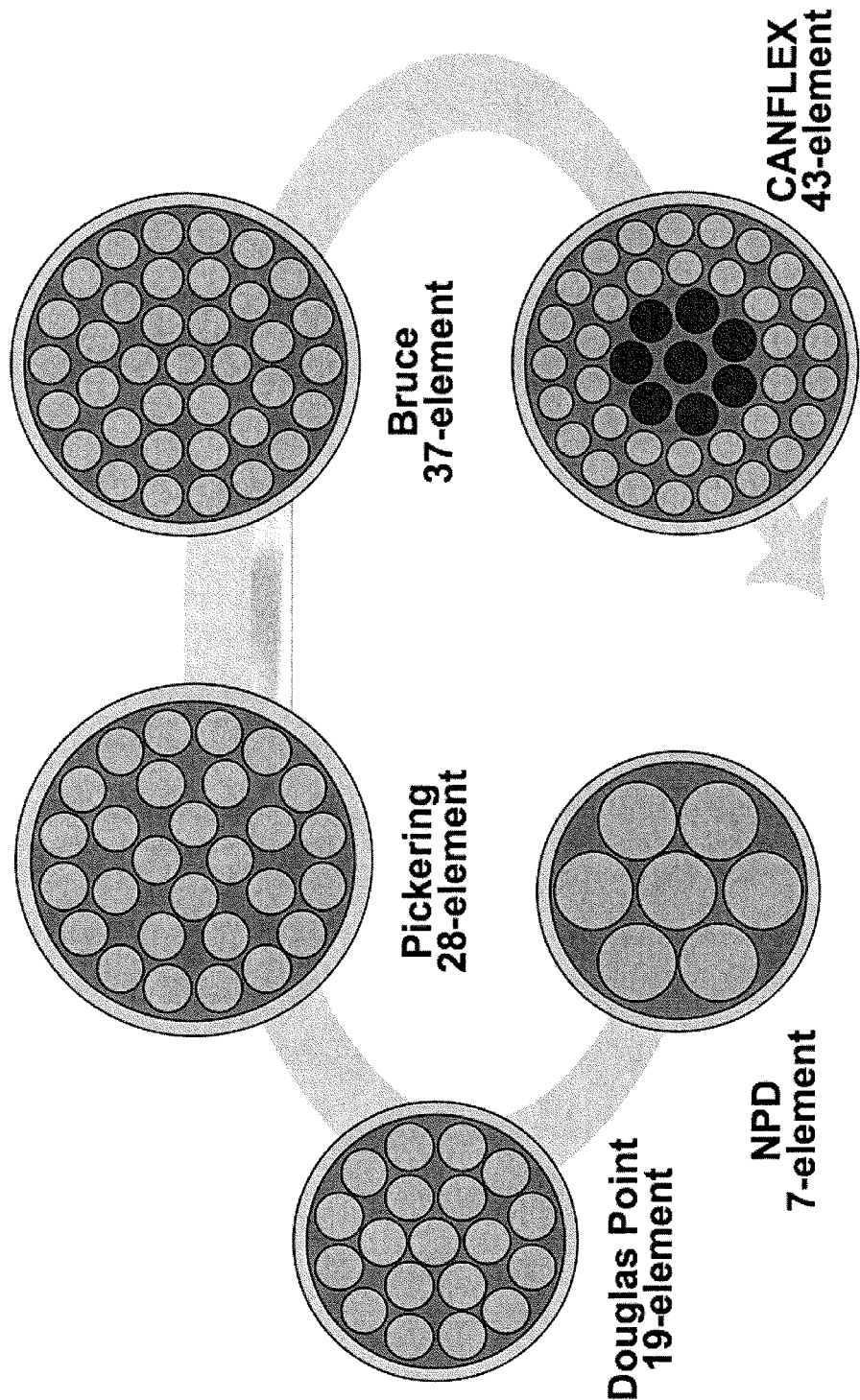
FIG. 2 shows the evolution of CANDU Fuels.
Figure 3:
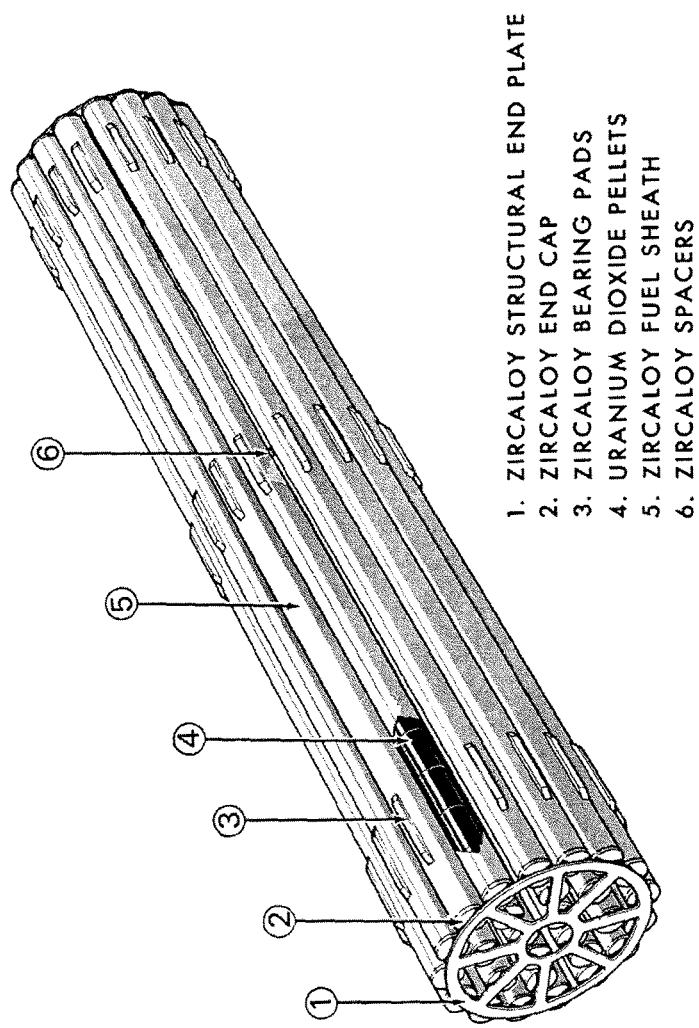
FIG. 3 is a schematic of CANDU fuel canister in accordance with this disclosure.

FIG. 2 depicts the evolution of CANDU fuel bundles (or canisters), wherein the Canadian CANDU fuel has evolved from 7-element fuel bundles in the Nuclear Power Demonstration (NPD) reactor, through 19-elements in the Douglas point reactor, 28-elements in the Pickering Nuclear Generating Station, to the 37-element bundle in CANDU 6 and Bruce and Darlington plants. Each evolution in design was accompanied by associated increases in fuel power and performance. The 43-element CANFLEX bundle was an extension to this evolution, in which the outer two rings of elements have a slightly smaller diameter and the remaining central elements have a slightly larger diameter than the standard 37 element design. While several of these fuel bundle designs are in use in Hard Water Reactors (HWR), a typical fuel bundle (or canister) design is the CANDU 6 and Bruce and Darlington, 37-element canister as shown in FIG. 3, comprising zircaloy structural end plate (1), zircaloy end cap (2), zircaloy bearing pads (3), fuel pellets (4), zircaloy fuel sheath (5), and zircaloy spacers (6).

Figure 4:
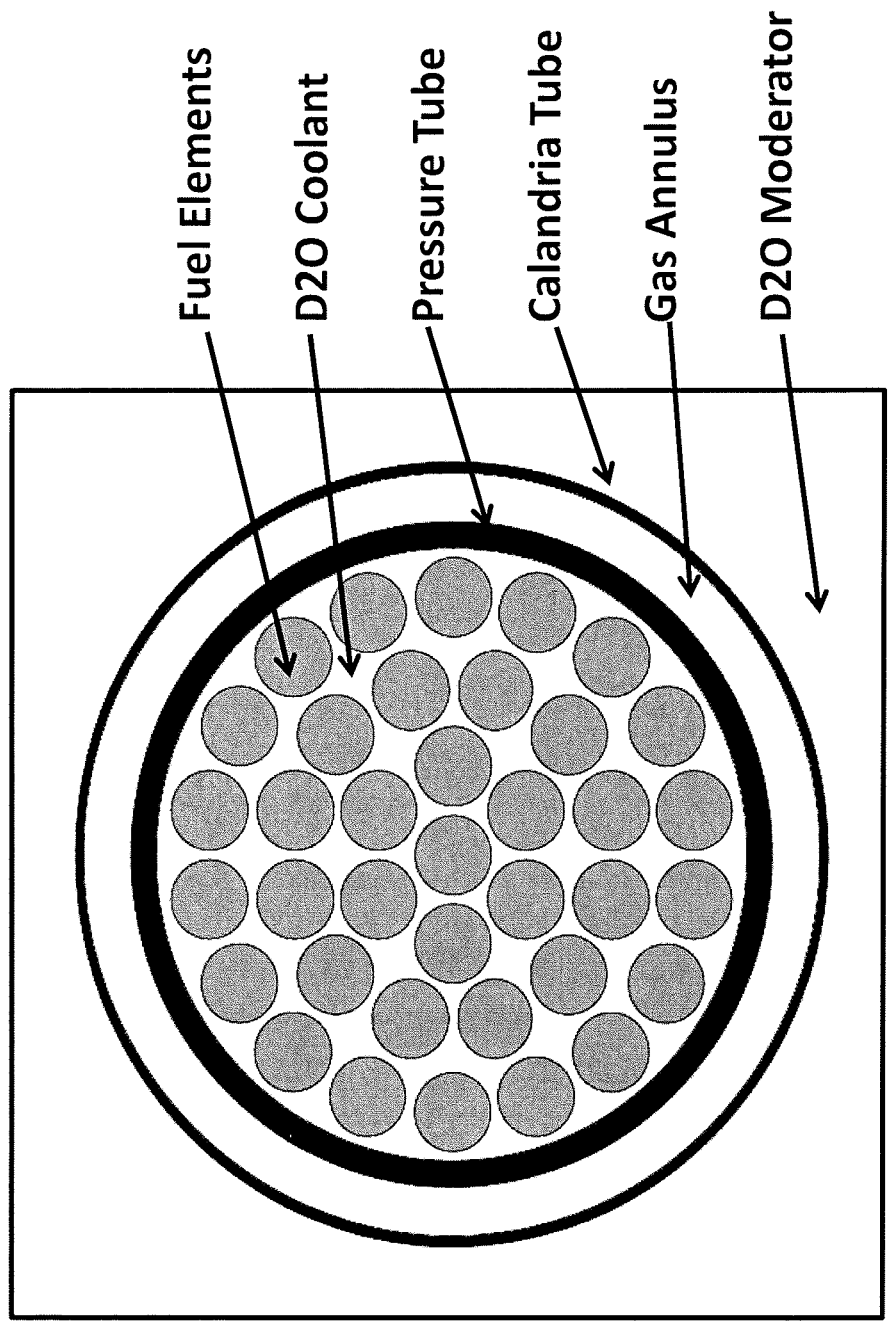
FIG. 4 is a cross section of 37-element CANDU fuel bundle lattice model in accordance with this disclosure.

FIG. 4 depicts the geometry of the 37-element fuel bundle which contains 1 element at the center, 6 elements on the inner ring, 12 elements on the intermediate ring, and 18 elements on the outer ring, all of which have the same diameter. In the 37-element fuel bundle, the D20 moderator is isolated from the hot pressure tube by a concentric calandria tube made of zircaloy-2. A gas annulus separates the pressure and calandria tubes.

One result of the FCM fuel assembly depletion calculation is a multiplication factor of the fuel assembly. The multiplication factor ("k") measures the average number of neutrons from one fission that cause another fission. The remaining neutrons either are absorbed in non-fission reactions or leave the nuclear system without being absorbed. When the value of k is smaller than one (1), the nuclear system cannot sustain a chain reaction because the reaction dies out. Where the value of k is one, each fission causes an average of one more fission, and thus leads to a constant fission level.

At a given level of k-infinity and a fixed TRISO particle kernel diameter, the rate of fuel burnup bears an inverse correlation with the packing fraction of the FCM fuel pellet. In other words, a higher packing fraction corresponds to a slower fuel burnup. Accordingly, a higher packing fraction (such as 40%) is more desirable than a lower packing fraction (such as 30%) because a longer time to burnup is desirable. Additionally, at a given level of k-infinity and a fixed packing fraction, the fuel burnup rate bears an inverse correlation with the TRISO particle kernel diameter. Therefore, a larger TRISO particle kernel diameter (such as 800 μm) is more desirable than a smaller TRISO particle kernel diameter (such as 400 μm) because a longer time to complete the fuel burnup is desirable. Furthermore, the burnup rate for a FCM UN fuel with a larger TRISO particle kernel diameter is more comparable to the burnup rate for the standard solid UO2 fuel, which is a desirable feature for replacement fuel assemblies.

Figure 5A:
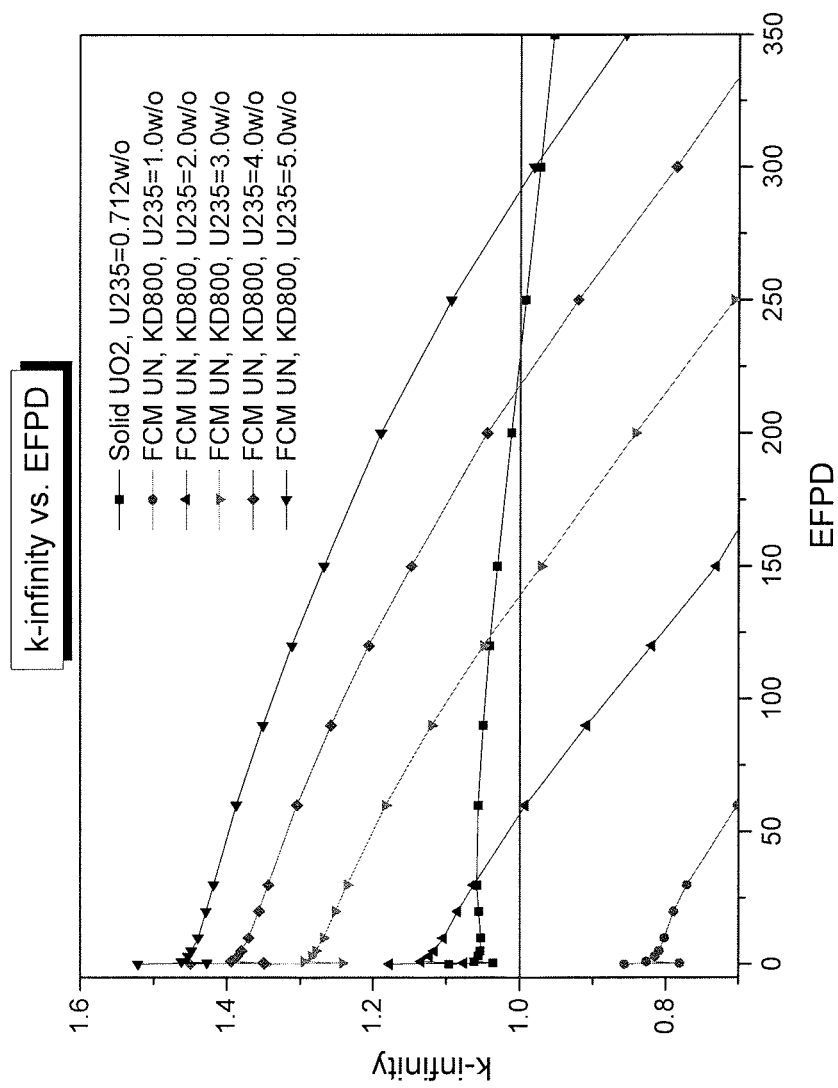
FIG. 5A is a graph illustrating the correlation between the k-infinity multiplication factor and effective full-power days for a standard reference fuel and various FCM Uranium Nitride (UN) fuel arrangements in accordance with this disclosure.
Figure 5B:
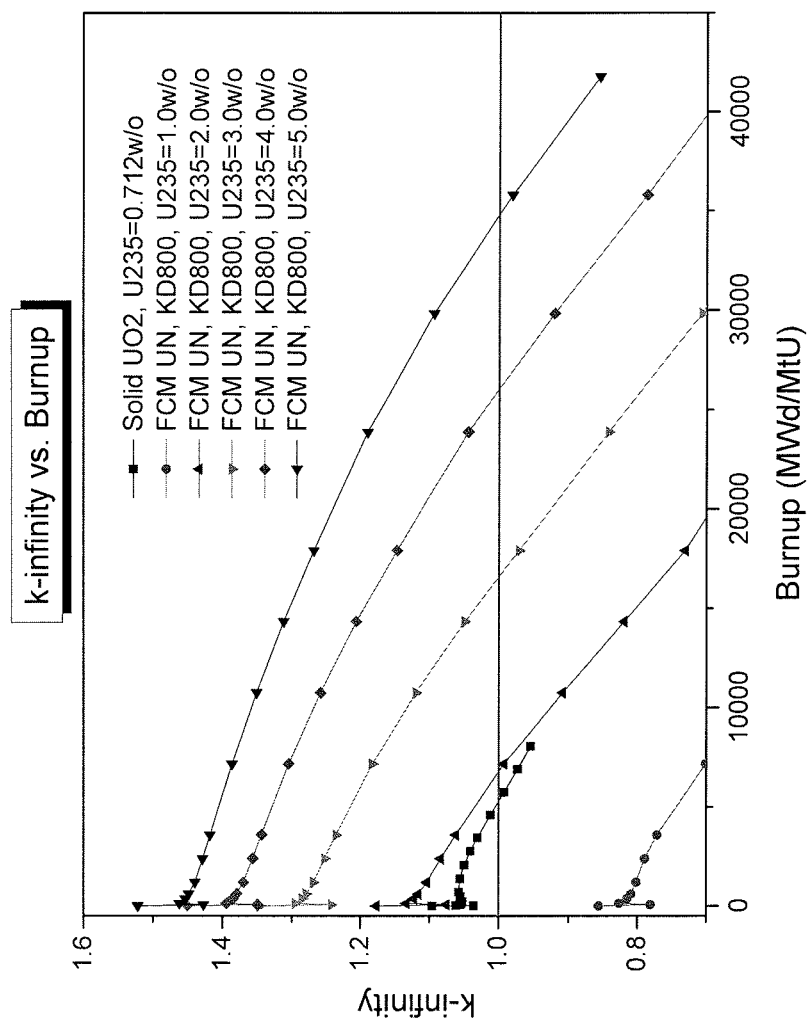
FIG. 5B is a graph illustrating the correlation between the k-infinity multiplication factor and burn up for a standard reference fuel and various FCM UN fuel arrangements in accordance with this disclosure.

FIG. 5A illustrates a correlation between the multiplication factor and effective full-power days ("EFPD") for five different FCM UN fuel assemblies and the conventional solid $U_2O$ fuel. EFPD is a measure of a fuel assembly's energy generation, and is determined as a ratio between the heat generation (planned or actual) in megawatt days thermal ("MWdt") and licensed thermal power in megawatts thermal ("MWt"). FIG. 5B illustrates the correlation between the multiplication factor and burnup for five different FCM UN fuel assemblies and the conventional solid $U_2O$ fuel. Both FIG. 5A and FIG. 5B show that, at a fixed TRISO particle kernel diameter size, as the heavy metal mass in an FCM UN fuel is increased, k-infinity of FCM UN fuel with above 4 w/o U-235 enrichment is comparable with solid fuel case. The substitution of UN fuel for the regular UO fuel is critical because of the higher density of UN, which allows lower enrichment to be utilized.

FIG. 6 illustrates the correlation between the multiplication factor and EFPD for the different FCM UN fuel assemblies with different burnable poisons and the conventional solid UO2. FIG. 6 shows that, at a fixed TRISO particle kernel diameter size, the $Gr_2O_3$ in FCM UN fuel depleted very fast and was discarded. The burnable poisons $B_4C$ and $Er_2O_3$ decreased initial higher reactivity in an FCM fuel. In case of $Er_2O_3$ (with a packing fraction of 2.7%), and mixed burnable poison, which comprised 0.2% packing fraction (pf) $B_4C$ BISO fuel pellet and 0.5% volume fraction (vf) $Er_2O_3$ in SiC matrix, the reactivity curve was comparable to the solid fuel case.

Figure 7:
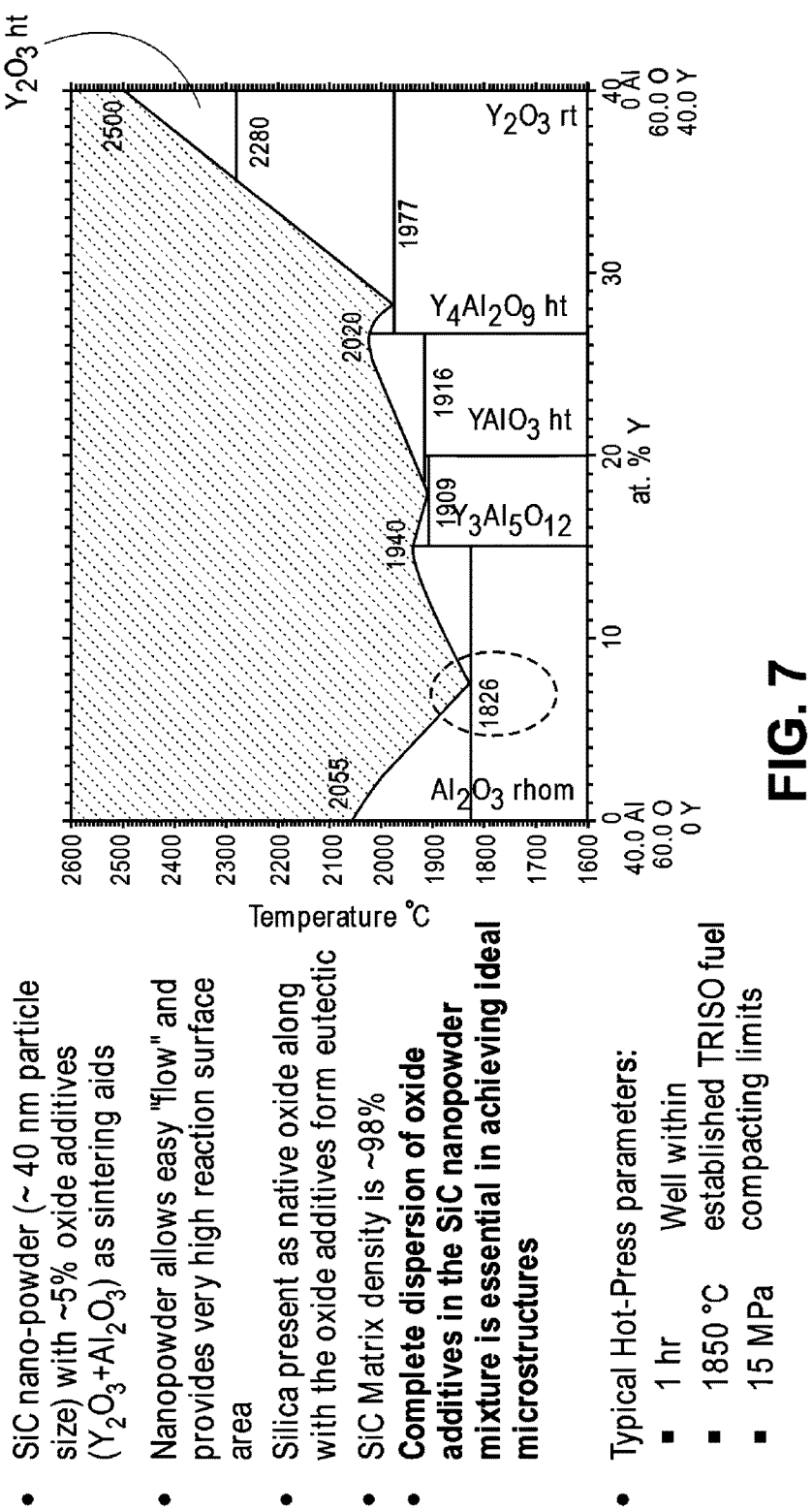
FIG. 7 is a graph illustrating results obtained by FCM Fuel Fabrication.
Figure 8A:
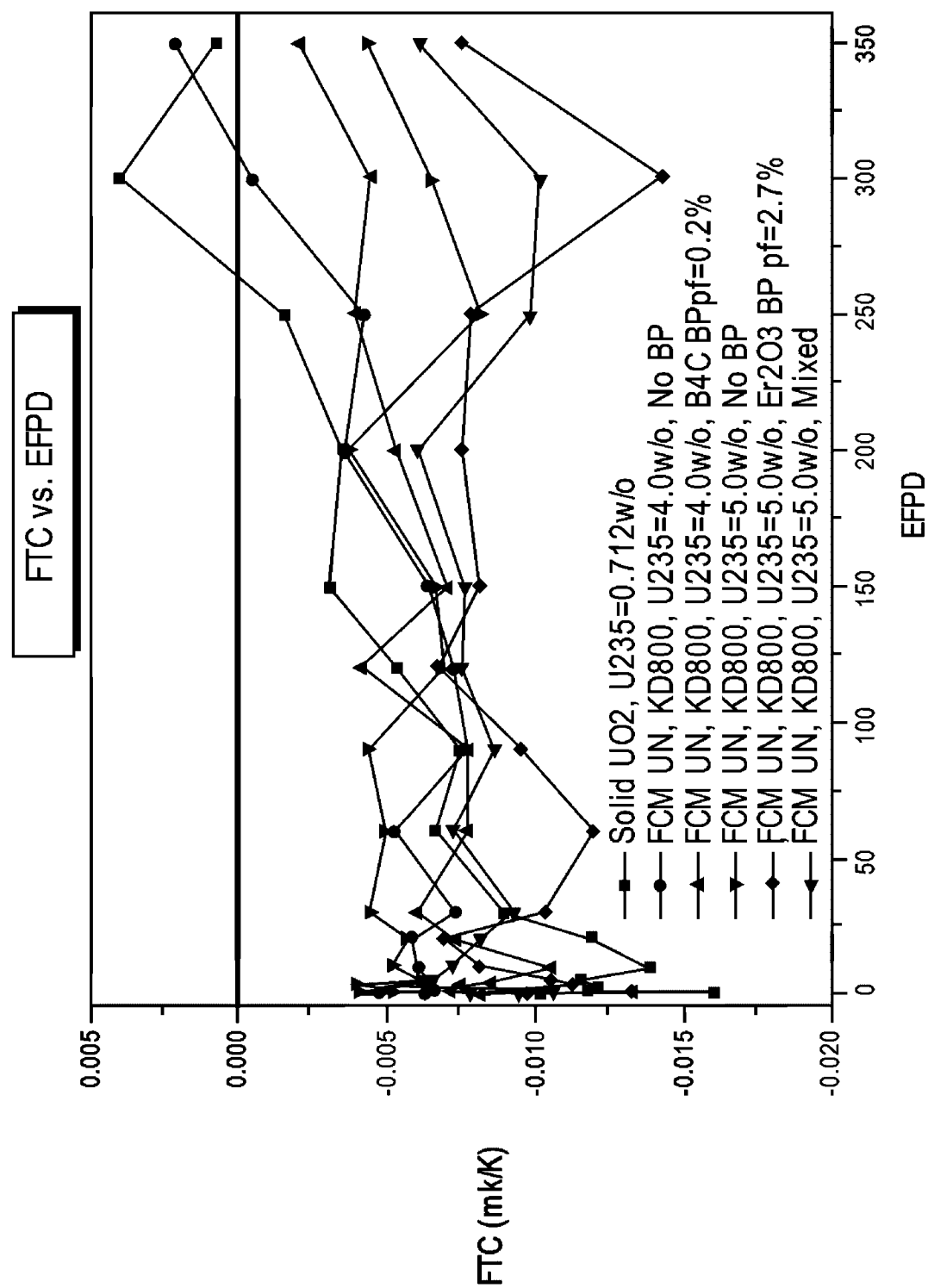
Figure 8B:
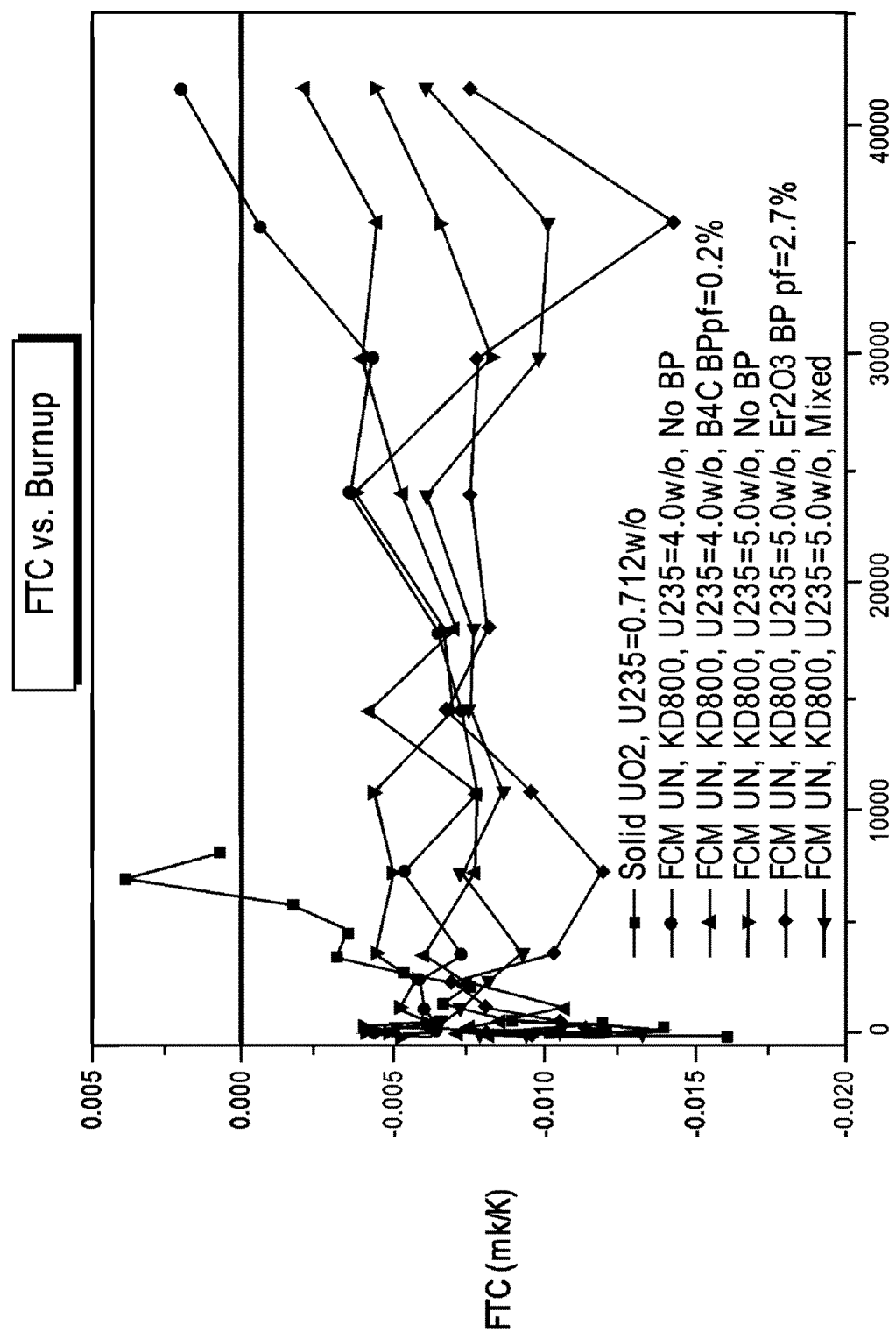
Figure 9:
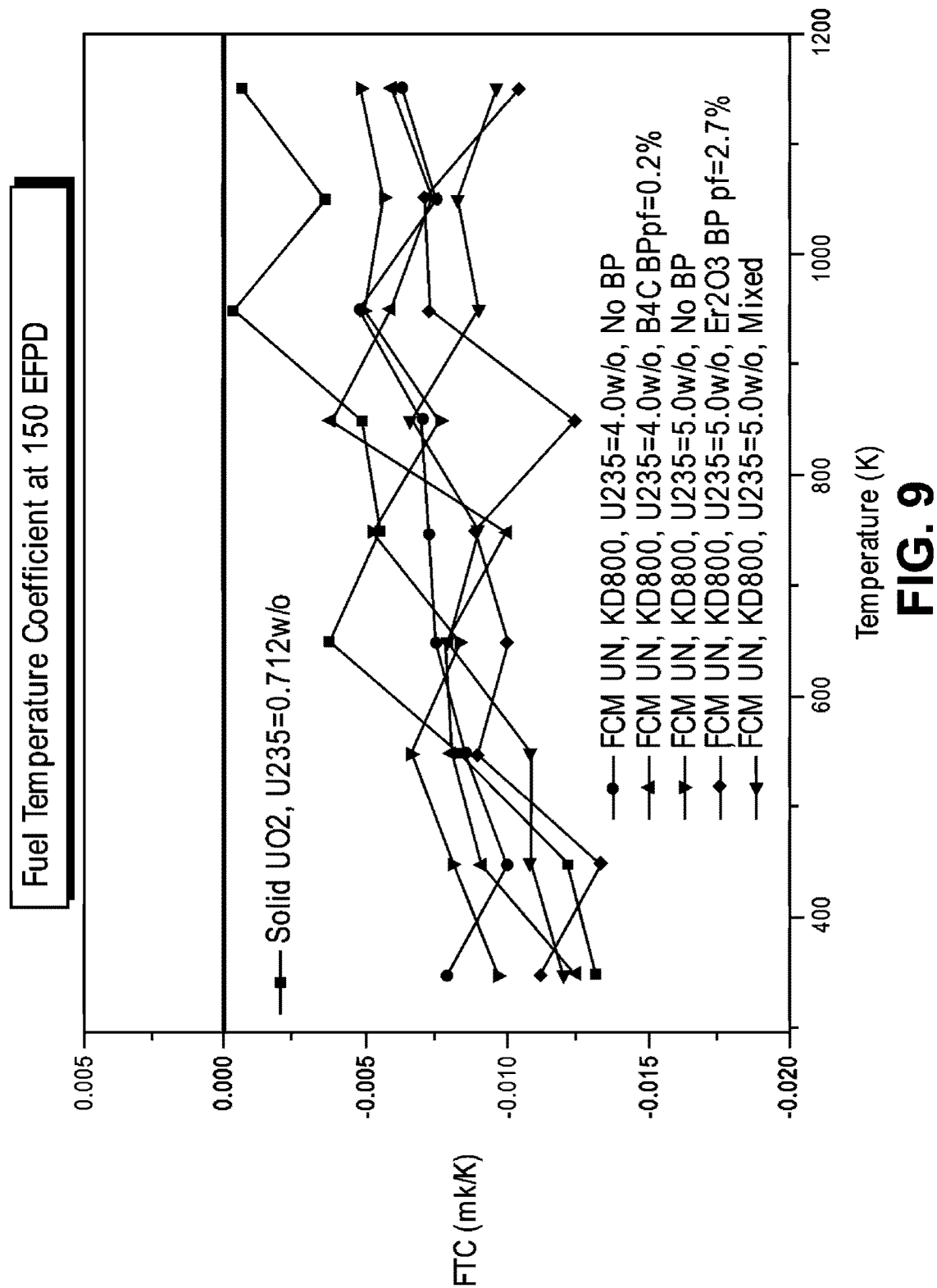
Figure 11A:
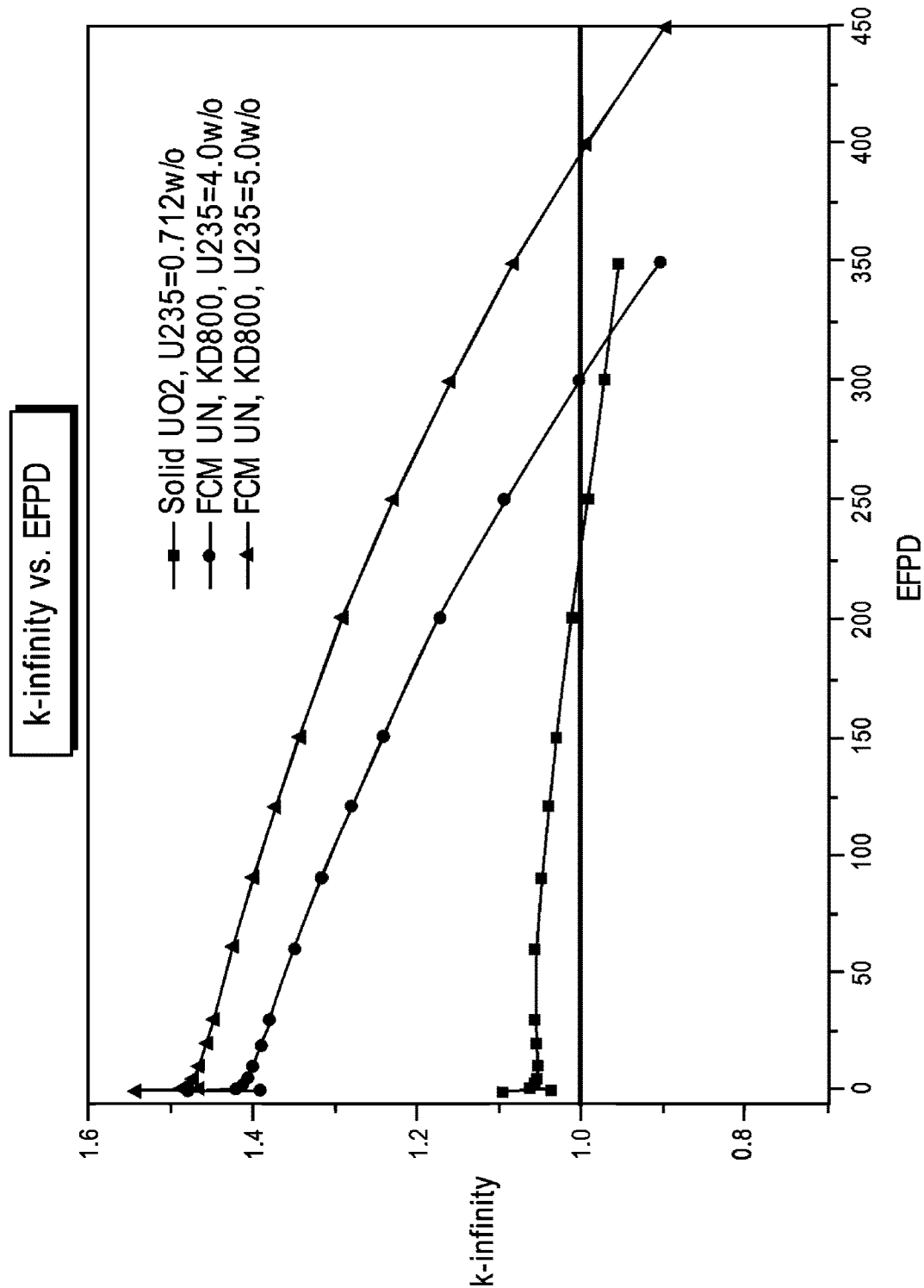
Figure 11B:
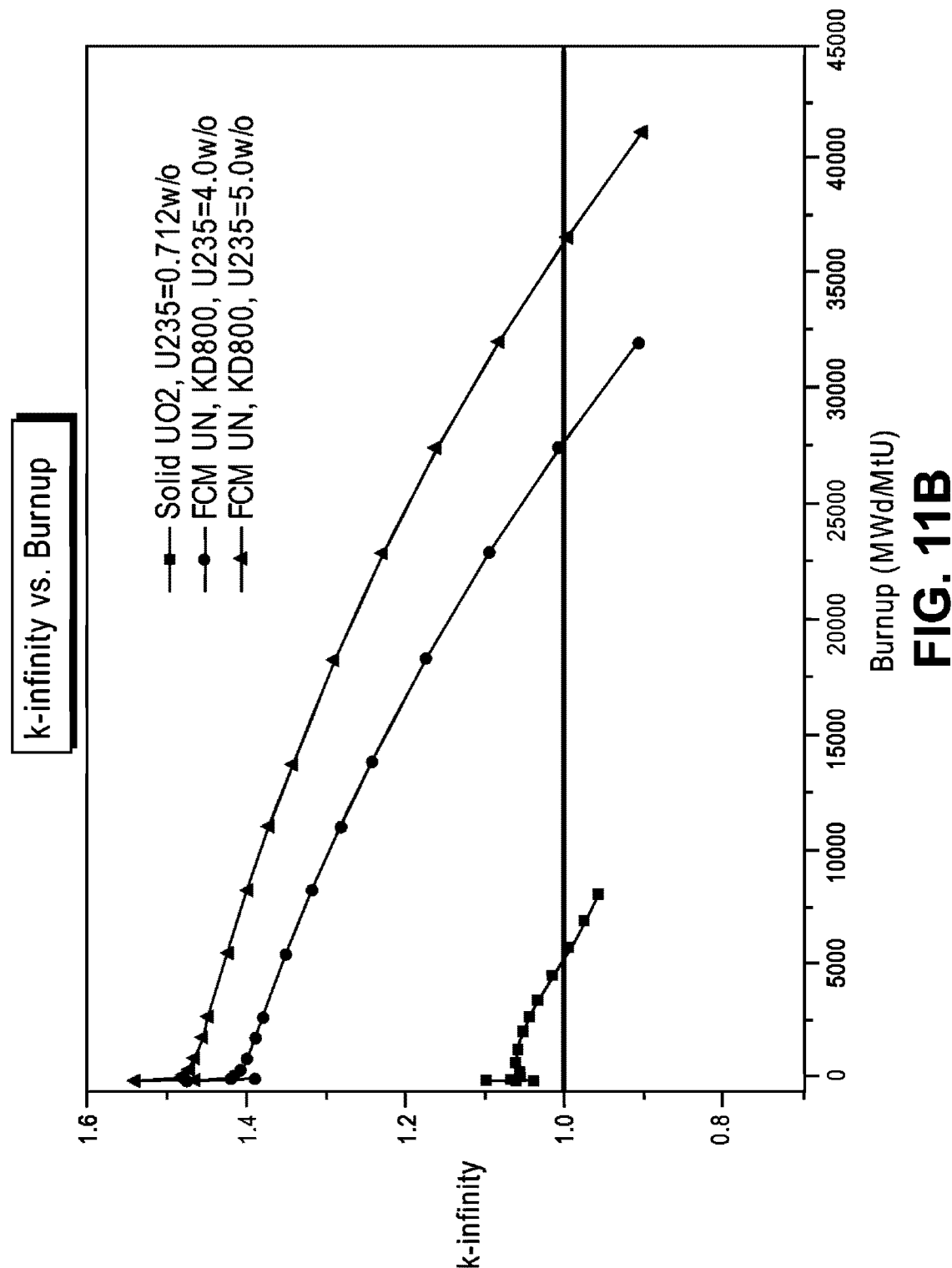
Figure 12A:
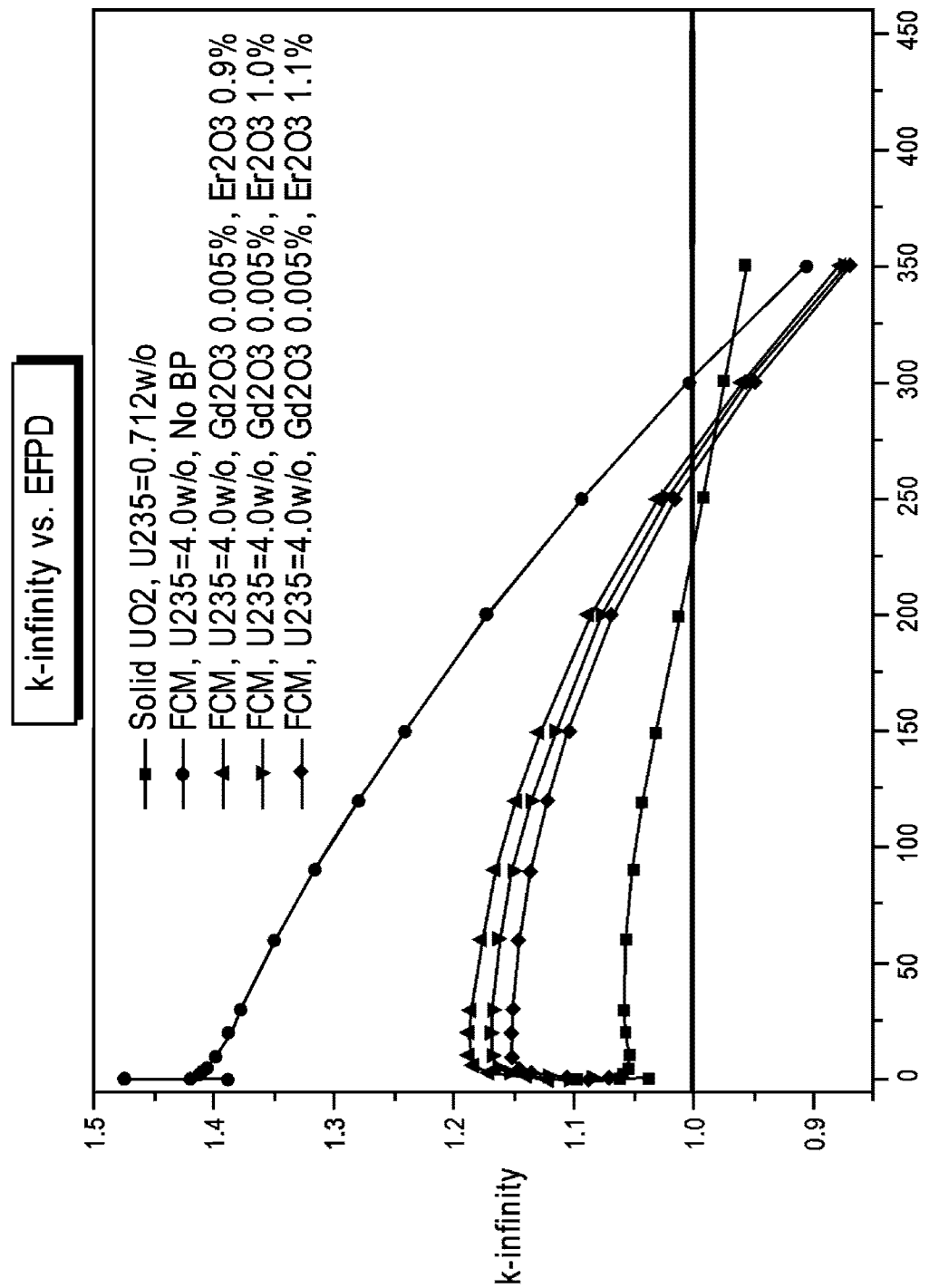
Figure 12B:
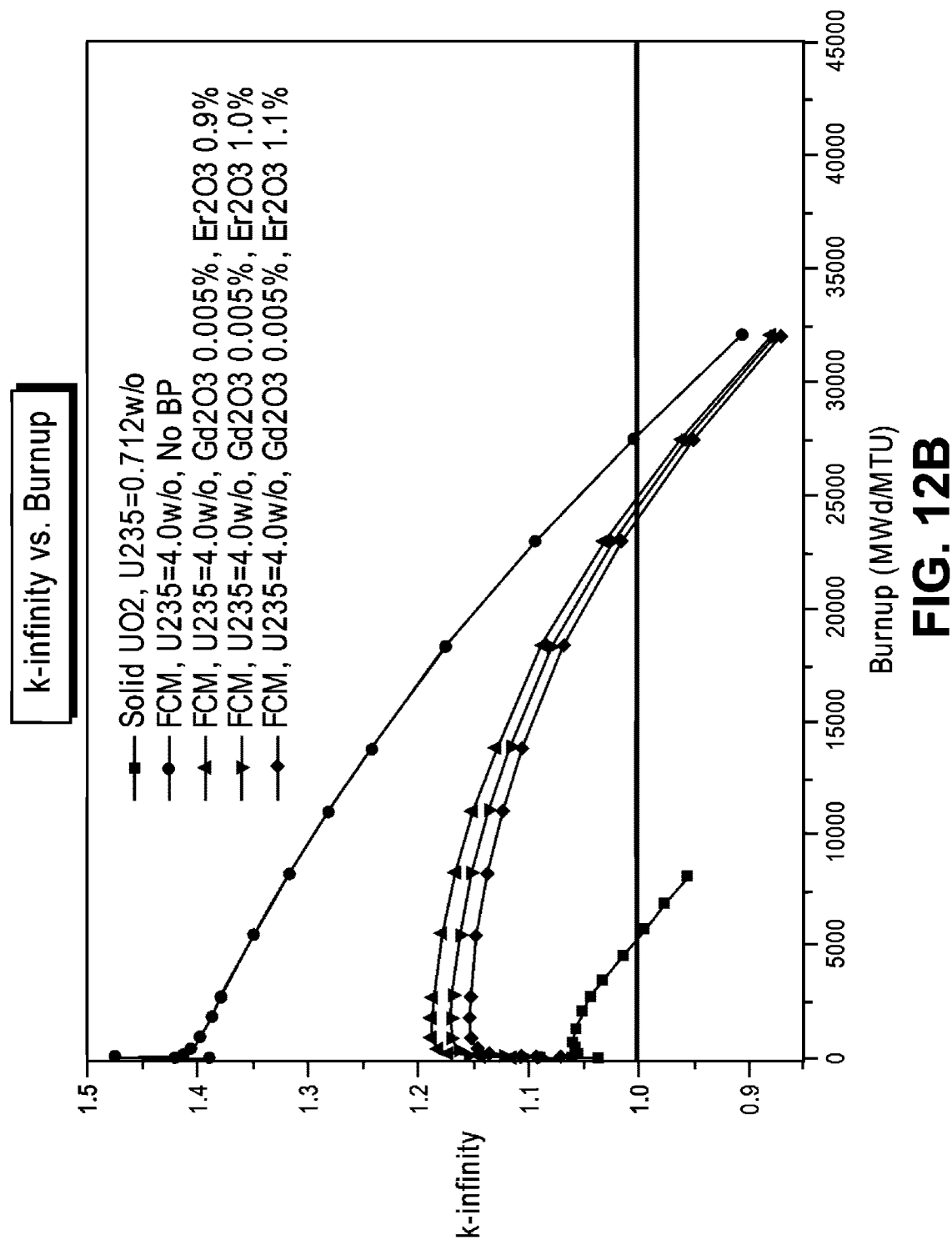
Figure 13A:
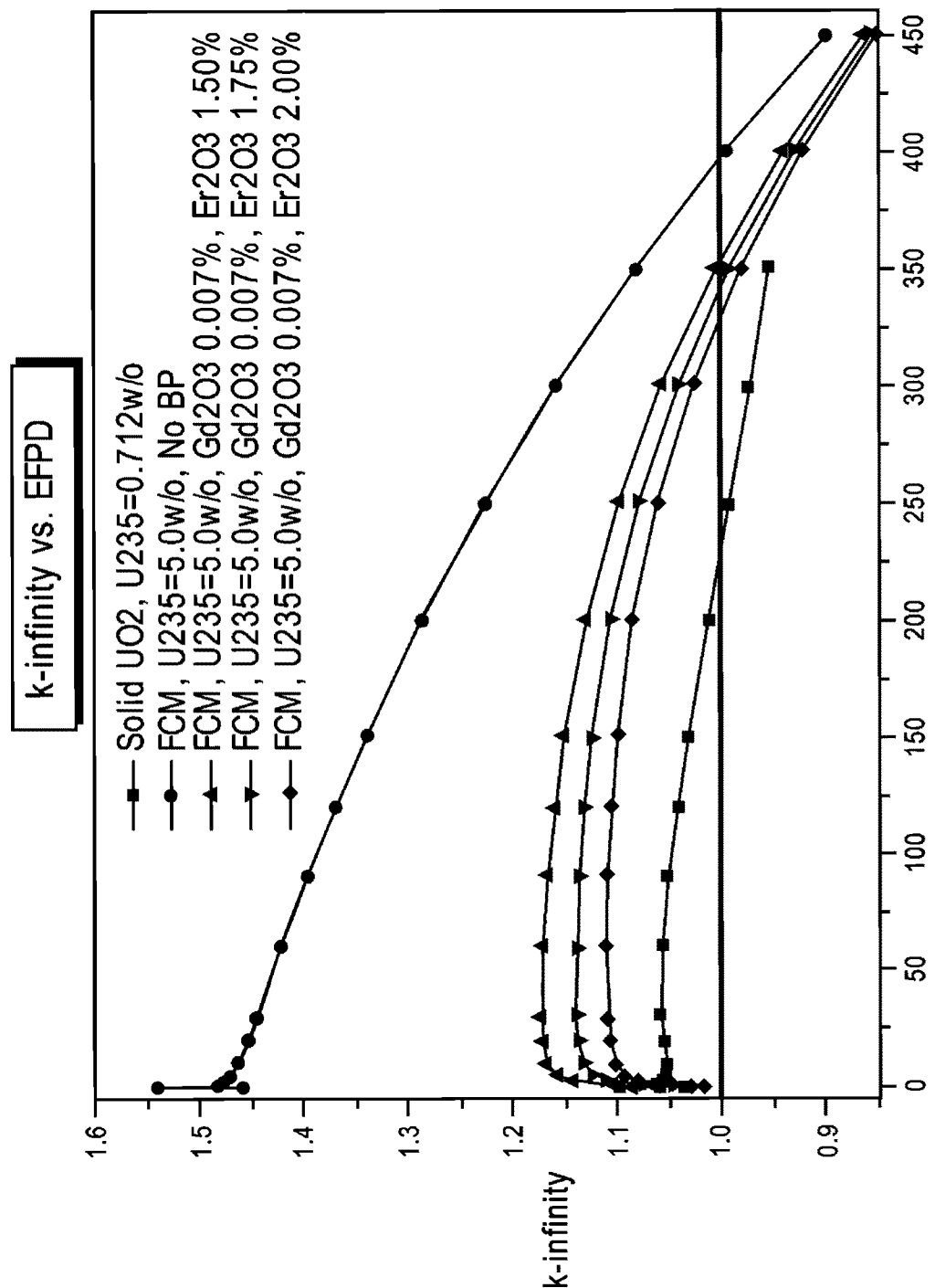
Figure 13B:
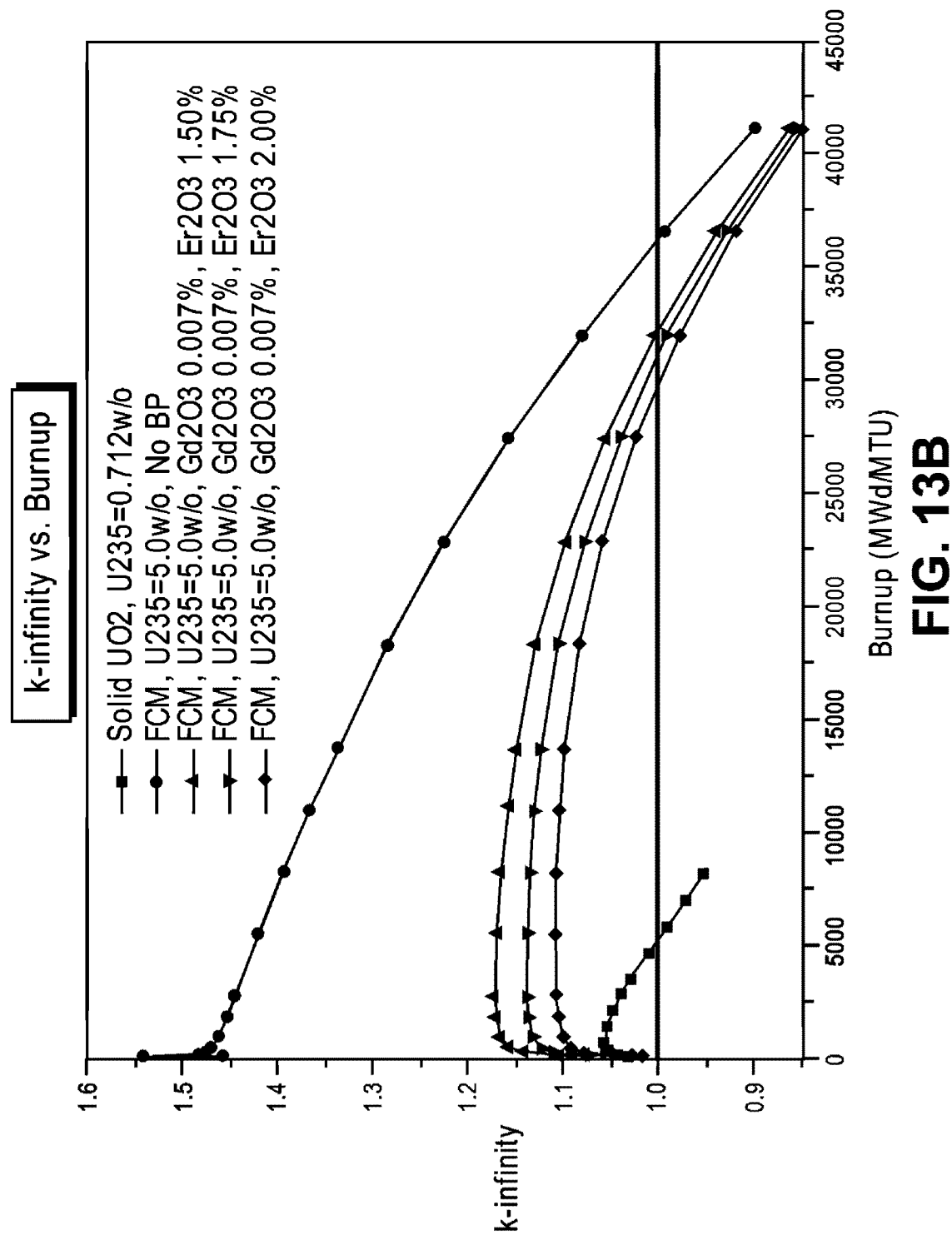

Fabrication of FCM fuel is disclosed, wherein FCM fuel is hot-pressed (for 1 hr at 1850° C. and 15 MPa) to form the SiC matrix around TRISO particles by NITE sintering process. Typically, SiC nano-powder (~40 nm particle size) with ~5% oxide additives ($Y_2O_3+Al_2O_3$) are used. The oxide additives ($Y_2O_3+Al_2O_3$) serve as sintering aids, and the nanopowder allows easy "flow" and provides very high reaction surface area. The silica present as native oxide along with the oxide additives form eutectic, and the density of SiC matrix formed is 98%. A complete dispersion of oxide additives in the SiC nanopowder mixture is preferable in achieving ideal microstructures. FIG. 7 illustrates that when Gadolinium and Erbium are used directly in the compacts in the form of oxide powders and mixed with the SiC powder in the sintering process that produces the compacts of the FCM fuel; such oxide powders aid in the compacting process by depressing the sintering temperature, and serve to replace the Yttrium and Aluminum oxides that are normally used as sintering aids for SiC matrix. As such, FIG. 7 shows that the burnable poisons such as Gd oxides and Er oxides can be used in the sintering of the SiC matrix to replace Y and Al oxides as sintering aids. An FCM fuel in which Gd oxides and Er oxides can be used to serve the process purpose as sintering aids, in addition to serving a reactive purpose as burnable poisons is disclosed.

Fuel temperature coefficient (FTC) is another temperature coefficient of reactivity. FTC is the change in reactivity per degree change in fuel temperature. FTC quantifies the amount of neutrons that the nuclear fuel absorbs from the fission process as the fuel temperature increases. A negative FTC is generally considered to be even more important than a negative moderator temperature coefficient (MTC) because fuel temperature immediately increases following an increase in reactor power. Moreover, FTC correlates with fuel burnup.

Figure 8A:
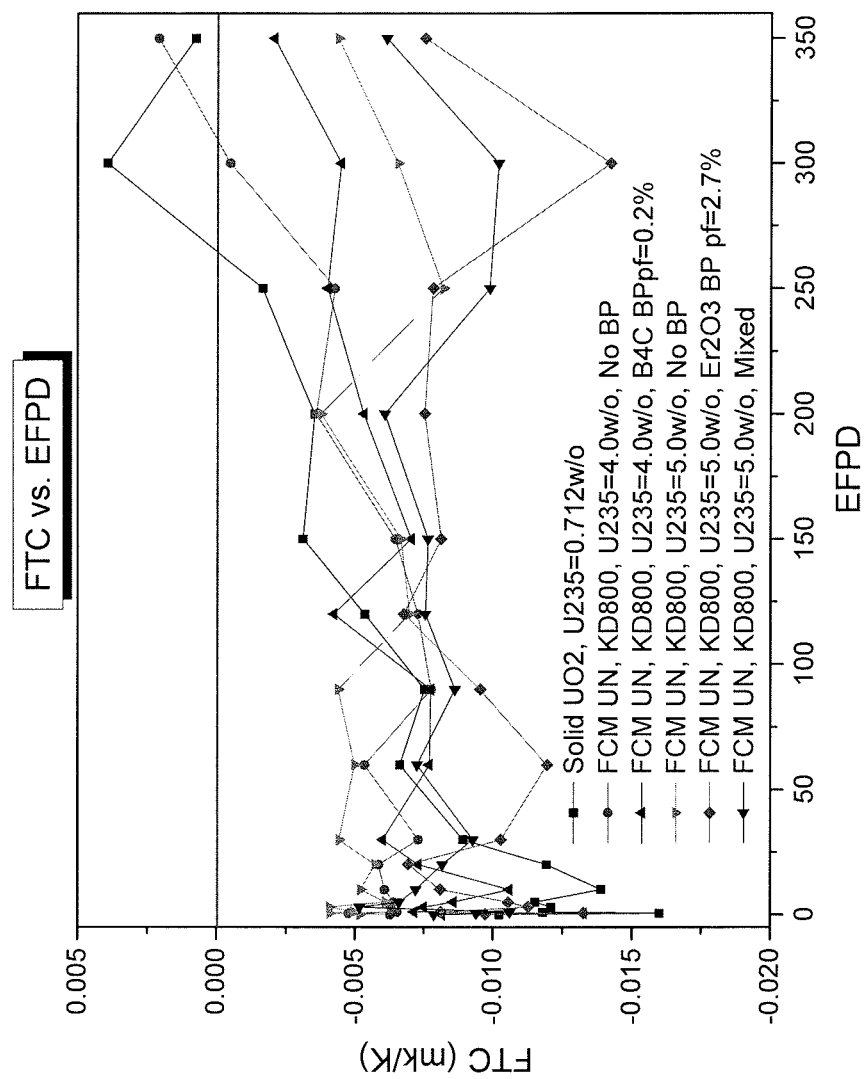
FIG. 8A is a graph illustrating the correlation between the fuel temperature coefficient and effective full-power days for a standard reference fuel and various FCM UN fuel arrangements with and without different burnable poisons in accordance with this disclosure.
Figure 8B:
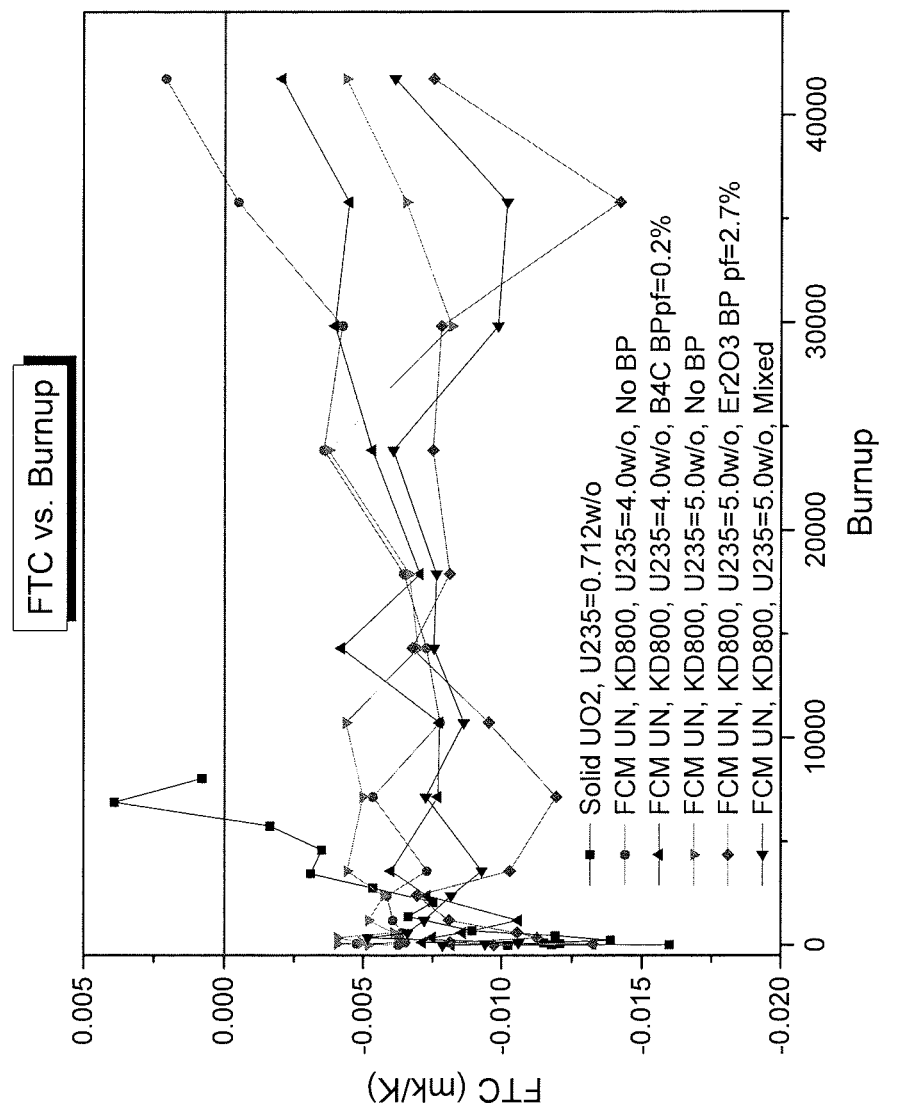
FIG. 8B is a graph illustrating the correlation between fuel temperature coefficient and burnup for a standard reference fuel and various FCM UN fuel arrangements with and without different burnable poisons in accordance with this disclosure.

FIG. 8A illustrates the correlation between FTC and EFPD for the different FCM UN fuel assemblies with and without burnable poisons and the conventional solid UO2. FIG. 8B illustrates the correlation between FTC and Burnup for the different FCM UN fuel assemblies with and without burnable poisons and the conventional solid UO2. Both FIG. 8A and FIG. 8B show added advantages of burnable poisons wherein, the results of FCM fuel bundle calculation are that a more negative FTC is achieved with respect to the original solid fuel case.

Figure 9:
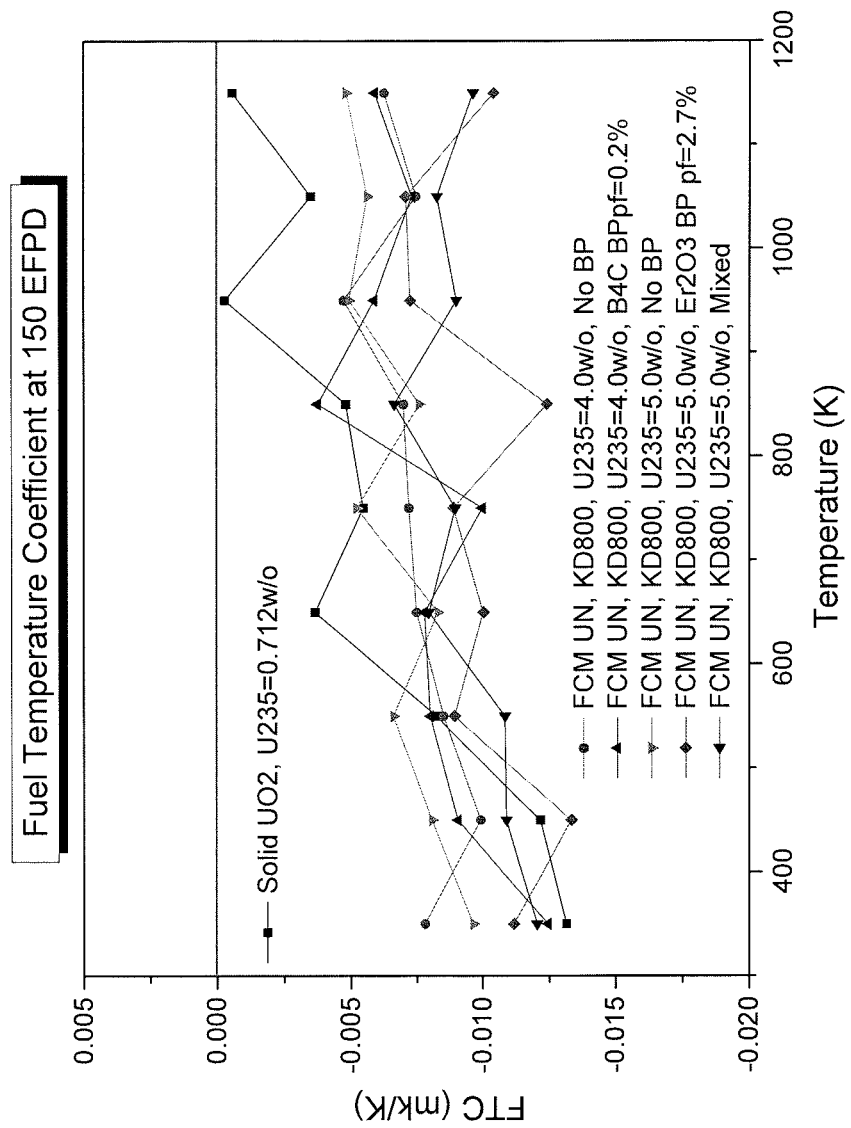
FIG. 9 is a graph illustrating the fuel temperature coefficients at 150 effective full-power days for a standard reference fuel and various FCM UN fuel arrangements with and without different burnable poisons in accordance with this disclosure.

FIG. 9 illustrates the correlation between FTC at 150 EFPC at various temperatures for the different FCM UN fuel assemblies with and without burnable poisons and the conventional solid UO2. FIG. 9 provides further support that results of FCM fuel bundle calculation are that a more negative FTC is achieved with respect to the original solid fuel case.

FIG. 10 shows a table highlighting the comparison of the fuel mass in a single fuel pin per unit.

Figure 11A:
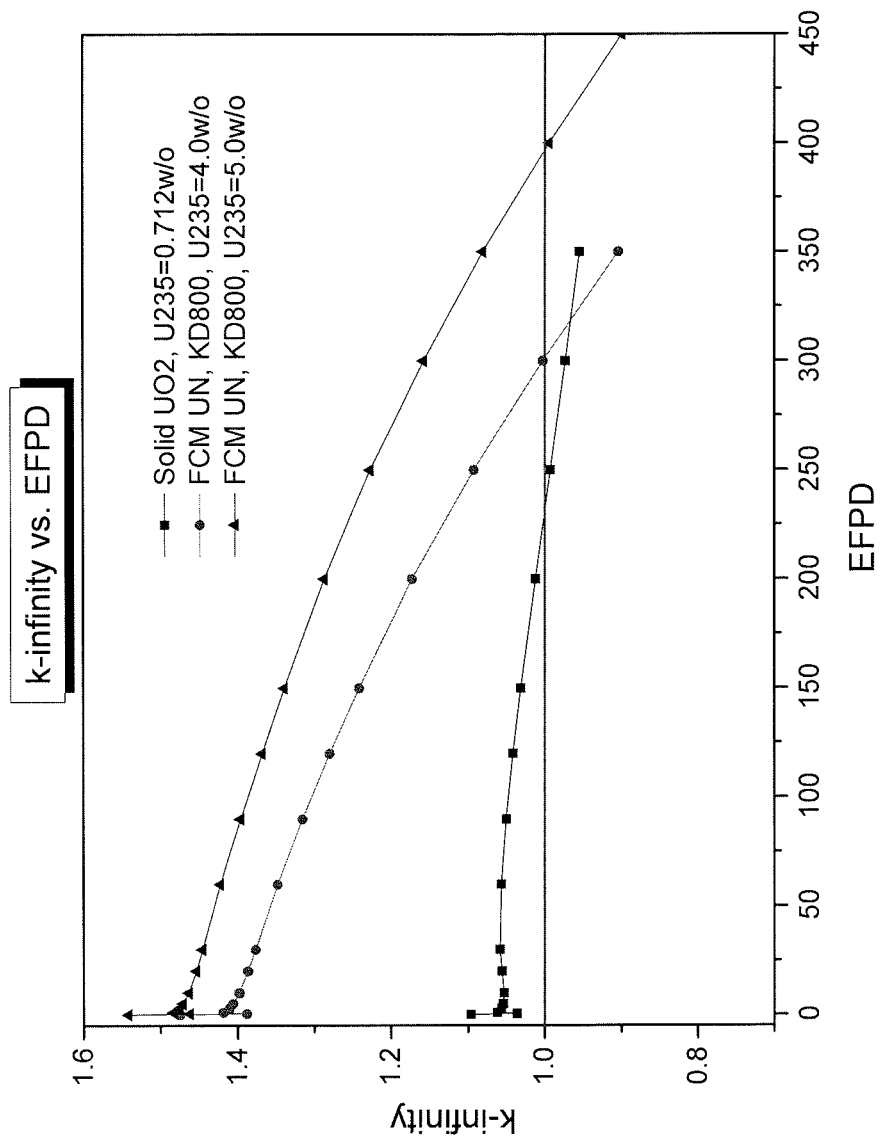
FIG. 11A is a graph illustrating the correlation between the k-infinity multiplication factor and effective full-power days for a standard reference fuel and various FCM UN fuel arrangements in accordance with this disclosure.
Figure 11B:
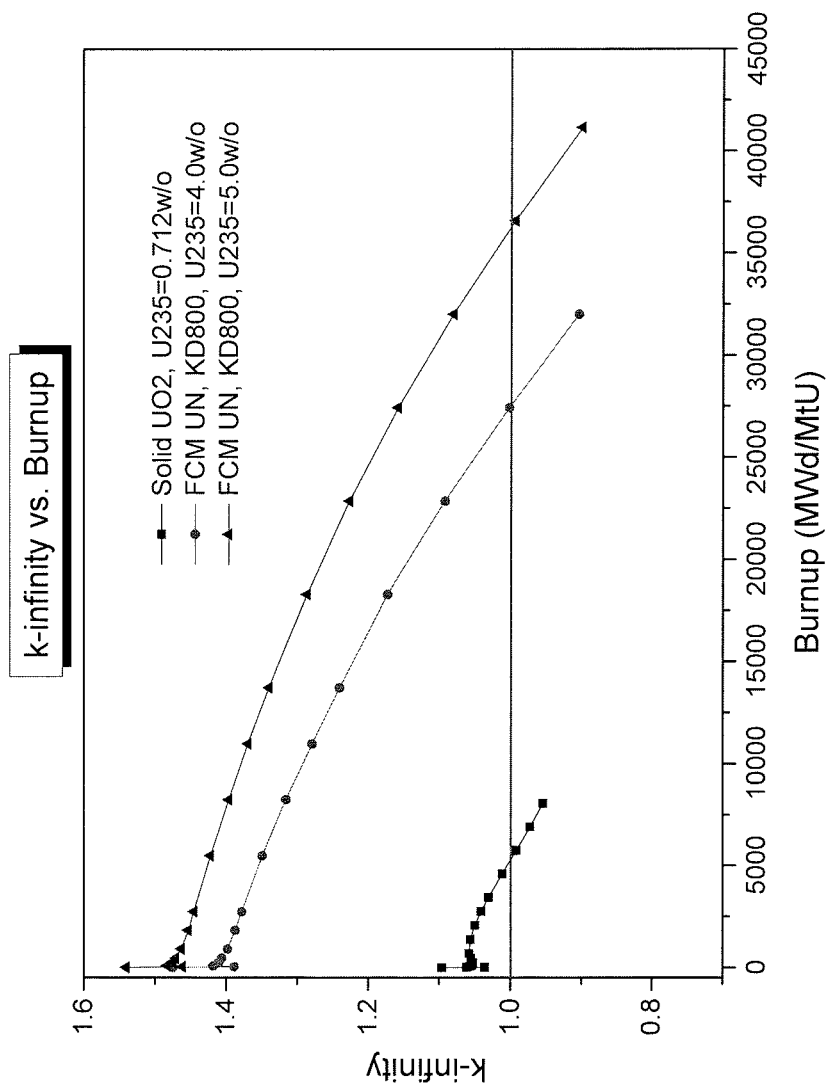
FIG. 11B is a graph illustrating the correlation between the k-infinity multiplication factor and burnup for a standard reference fuel and various FCM UN fuel arrangements in accordance with this disclosure.

FIG. 11A illustrates the correlation between the multiplication factor and EFPD for the different FCM UN fuel assemblies and the conventional solid UO2. For example, the k-infinity of the FCM UN fuel assemblies, both at 4.0 w/o U-235 enrichment and 5.0 w/o U-235 enrichment, is very high at around 1.4 and 1.5. FIG. 11B illustrates the correlation between the multiplication factor and burnup for the different FCM UN fuel assemblies and the conventional solid UO2 fuel. For example, the burnup rates of the FCM UN fuel assemblies, both at 4.0 w/o U-235 enrichment and 5.0 w/o U-235 enrichment, are very high as compared to the conventional solid UO2 fuel. FIG. 11A and FIG. 11B show that without the presence of burnable poisons the reactivity of FCM UN fuel assemblies, both at 4.0 w/o U-235 enrichment and 5.0 w/o U-235 enrichment, is very high.

Figure 12A:
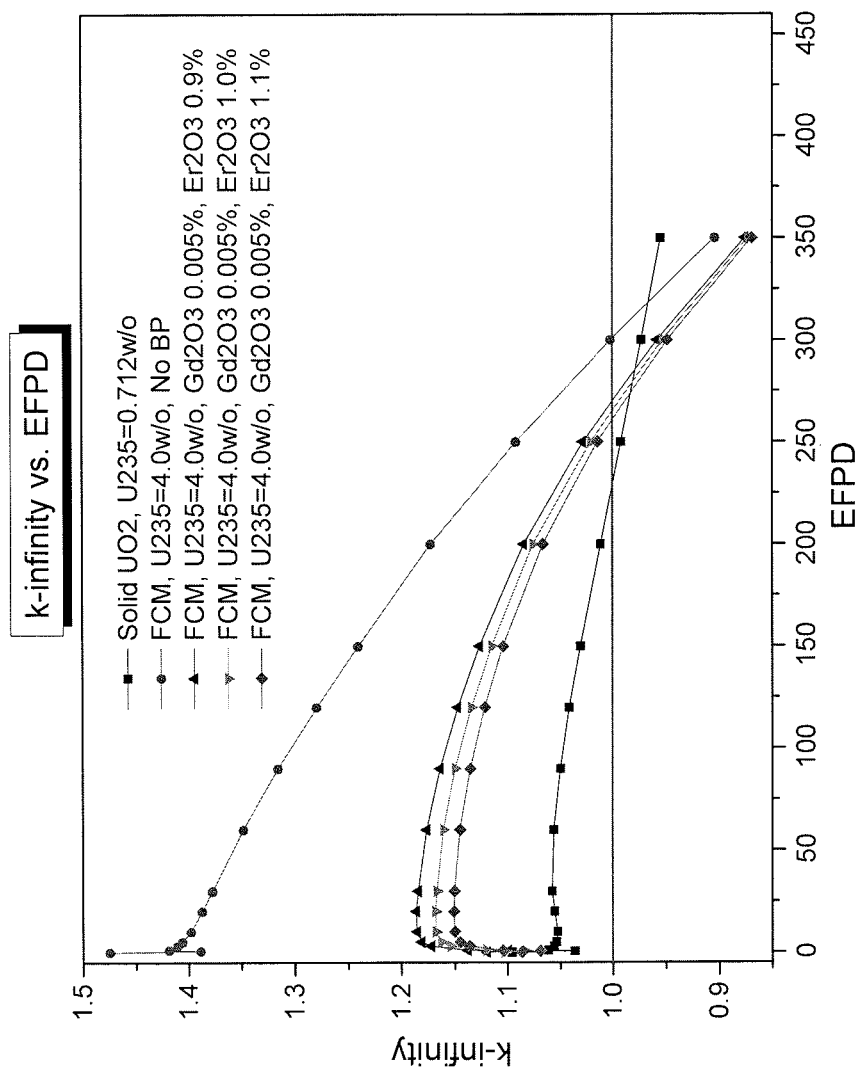
FIG. 12A is a graph illustrating the correlation between the k-infinity multiplication factor and effective full-power days for a standard reference fuel and various FCM fuel arrangements with and without different burnable poisons in accordance with this disclosure.
Figure 12B:
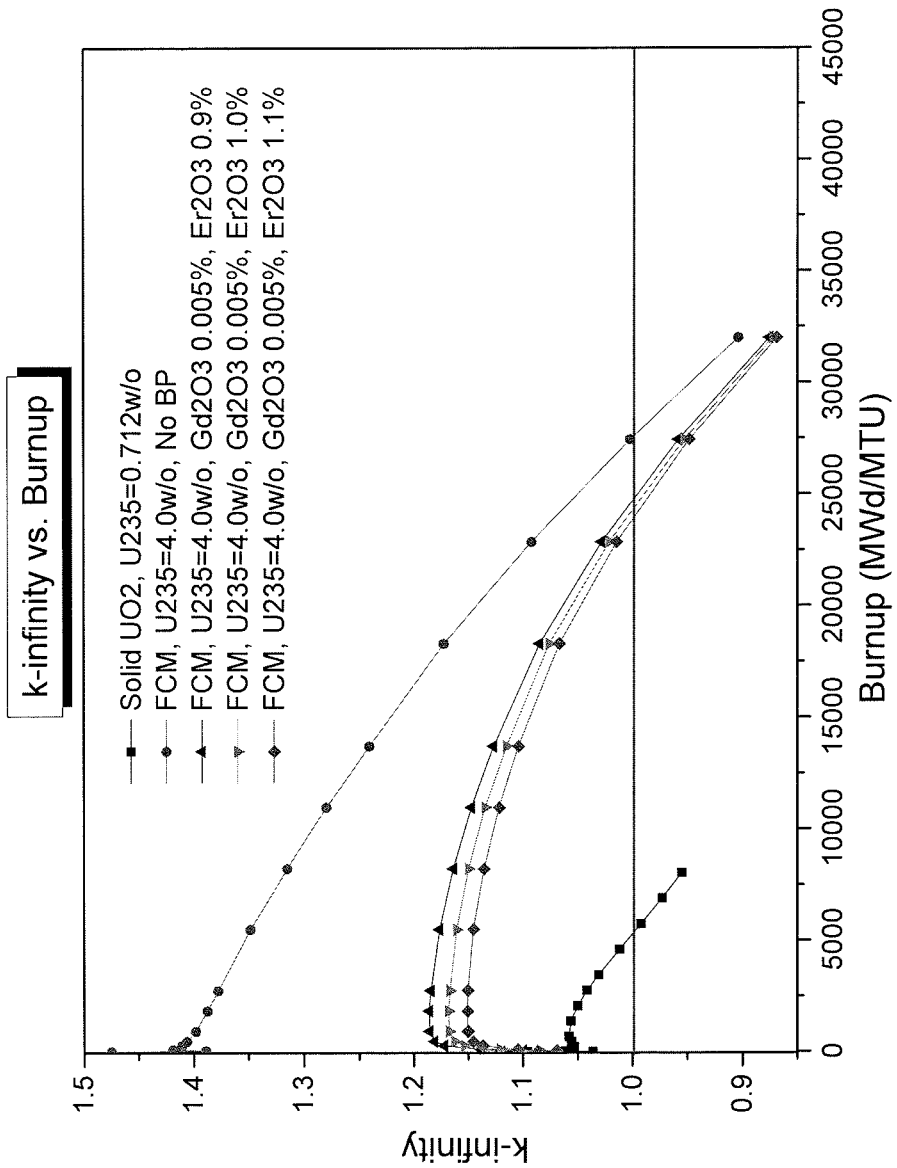
FIG. 12B is a graph illustrating the correlation between the k-infinity multiplication factor and burnup for a standard reference fuel and various FCM fuel arrangements with and without different burnable poisons in accordance with this disclosure.

FIG. 12A illustrates the correlation between the multiplication factor and EFPD for the different FCM fuel assemblies, with 4.0 w/o U-235 enrichment, at various concentrations of burnable poisons, and the conventional solid UO2. For example, the k-infinity of the FCM fuel with no burnable poisons is very high, at about 1.5; and k-infinity for FCM fuels comprising burnable poisons is comparable to the conventional solid UO2 fuel. FIG. 12B illustrates the correlation between the multiplication factor and burnup for the different FCM fuel assemblies, with 4.0 w/o U-235 enrichment, at various concentrations of burnable poisons, and the conventional solid UO2. FIG. 12B shows the burnup rates of the FCM fuels with 4.0 w/o U-235 enrichment, with the burnable poisons $Gd_2O_3$ and $Er_2O_3$, both at various concentrations, are comparable to that of conventional solid UO2 fuel.

Figure 13A:
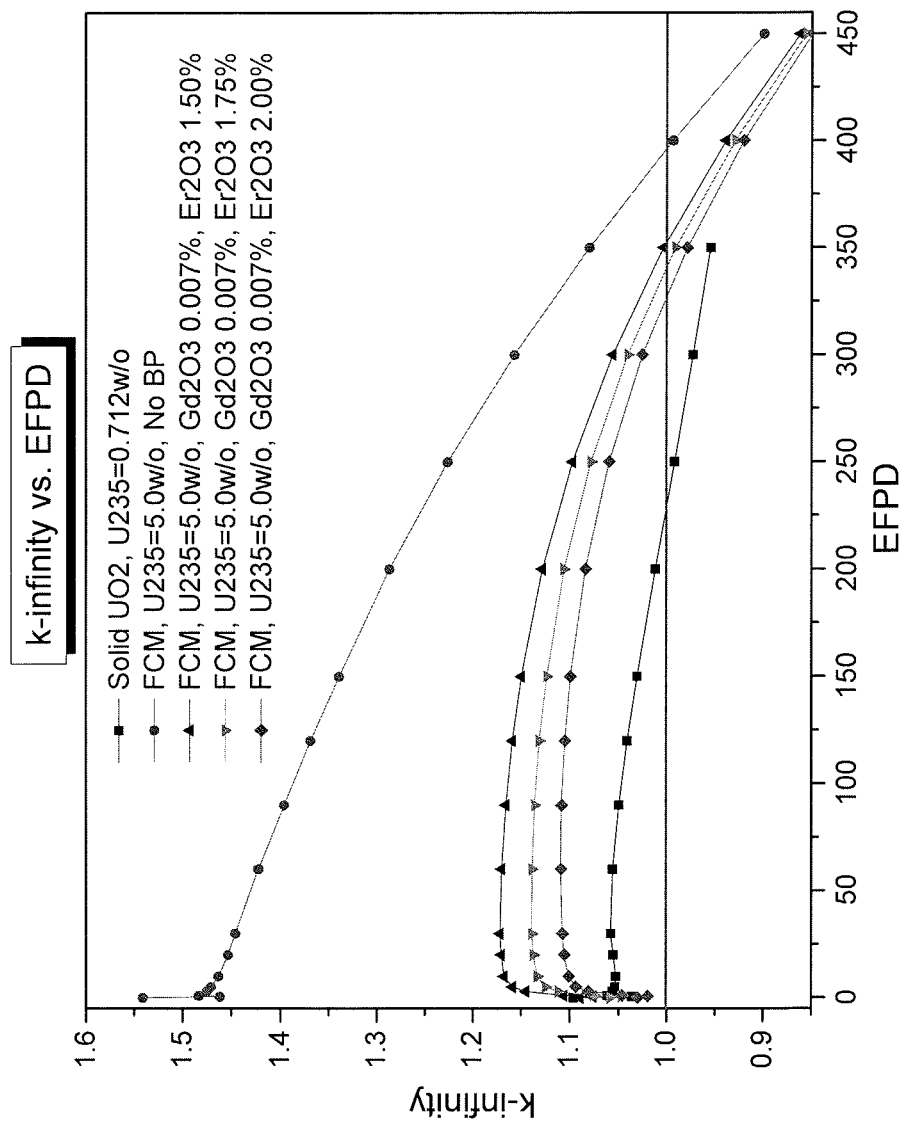
FIG. 13A is a graph illustrating the correlation between the k-infinity multiplication factor and effective full-power days for a standard reference fuel and various FCM fuel arrangements with and without different burnable poisons in accordance with this disclosure.
Figure 13B:
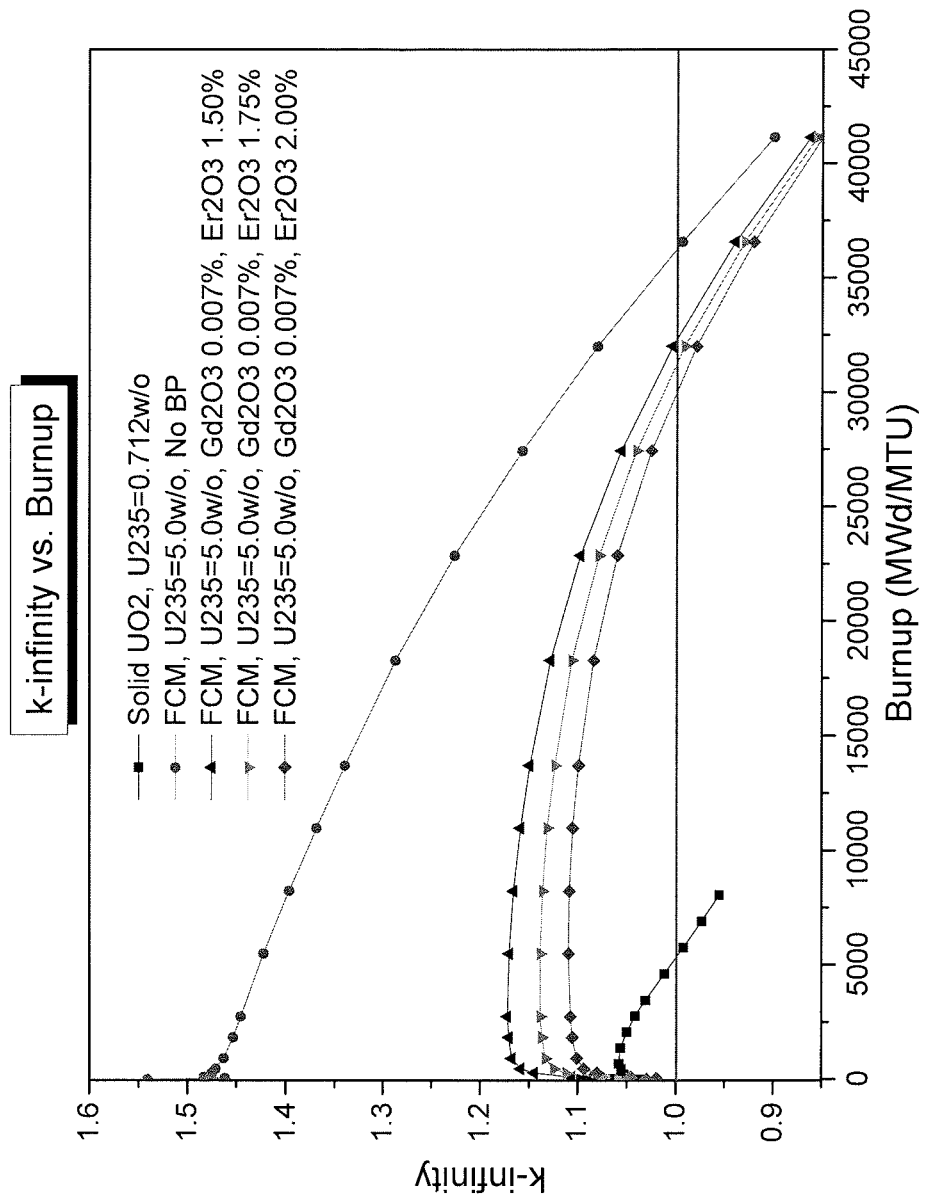
FIG. 13B is a graph illustrating the correlation between the k-infinity multiplication factor and burnup for a standard reference fuel and various FCM fuel arrangements with and without different burnable poisons in accordance with this disclosure.
Figure 1A:
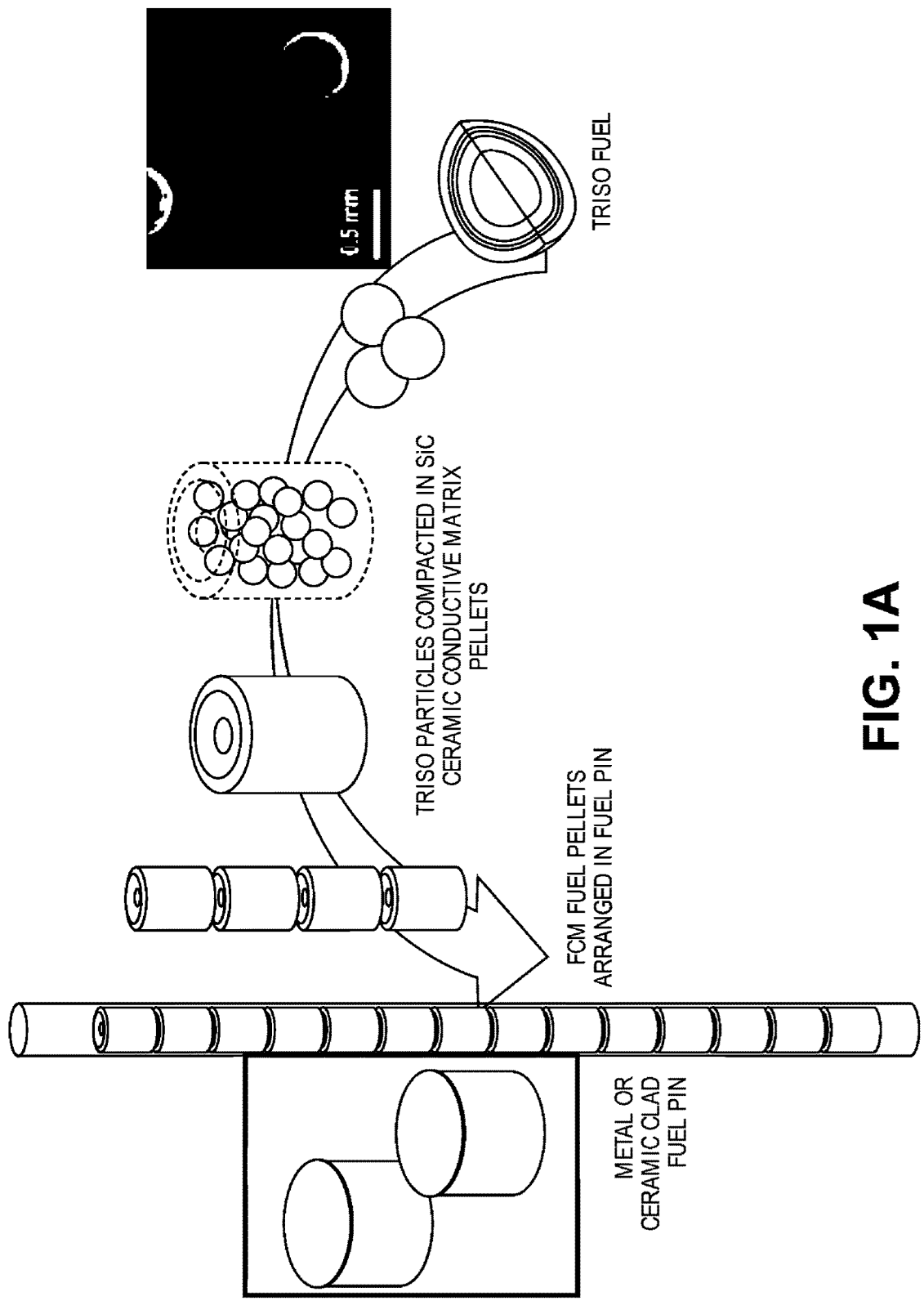
Figure 1B:
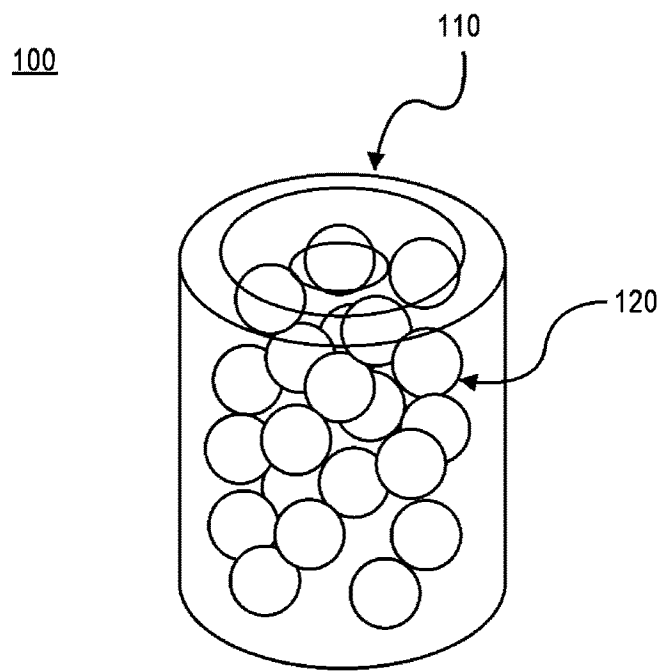
Figure 2:
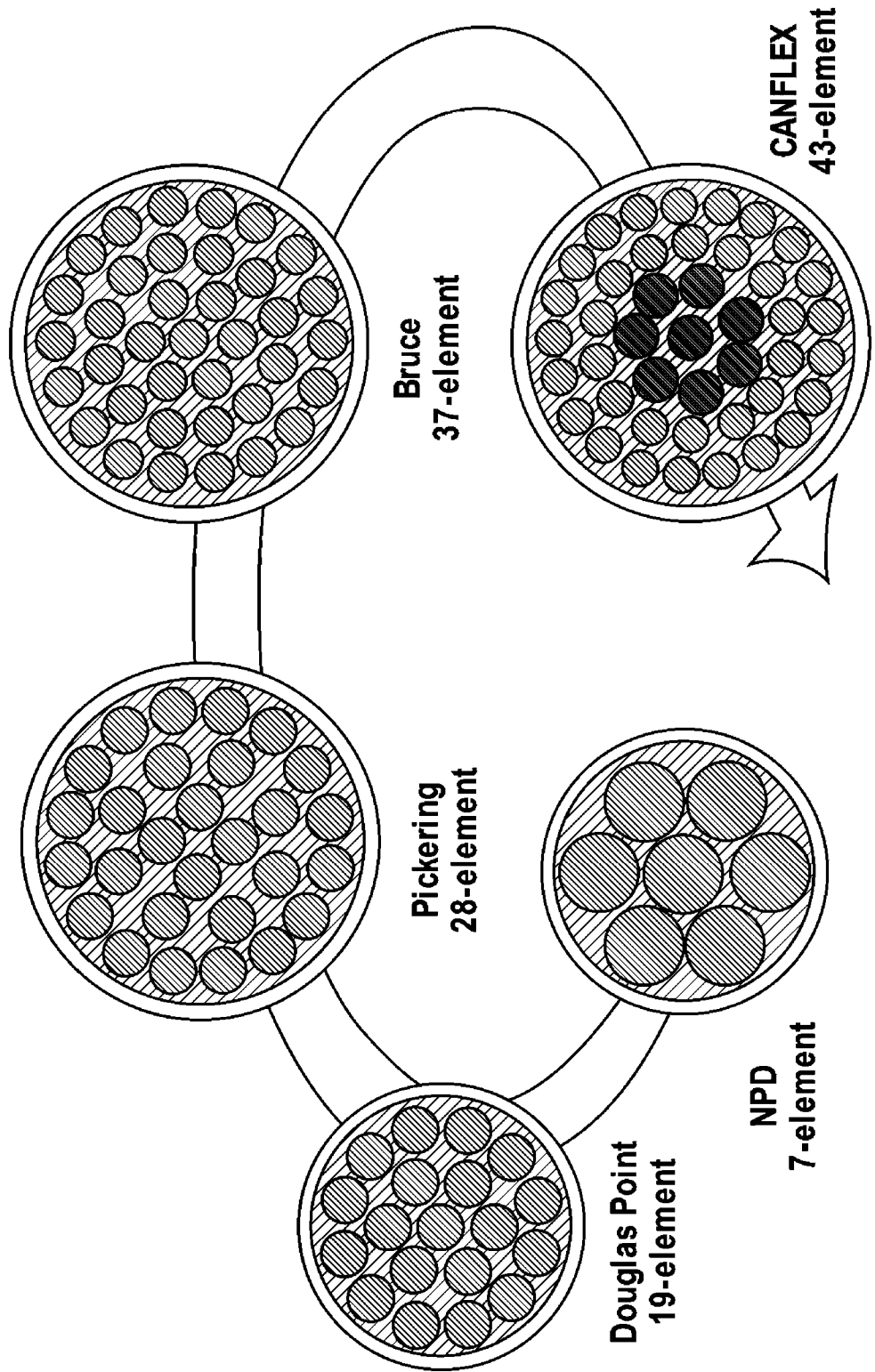
Figure 3:
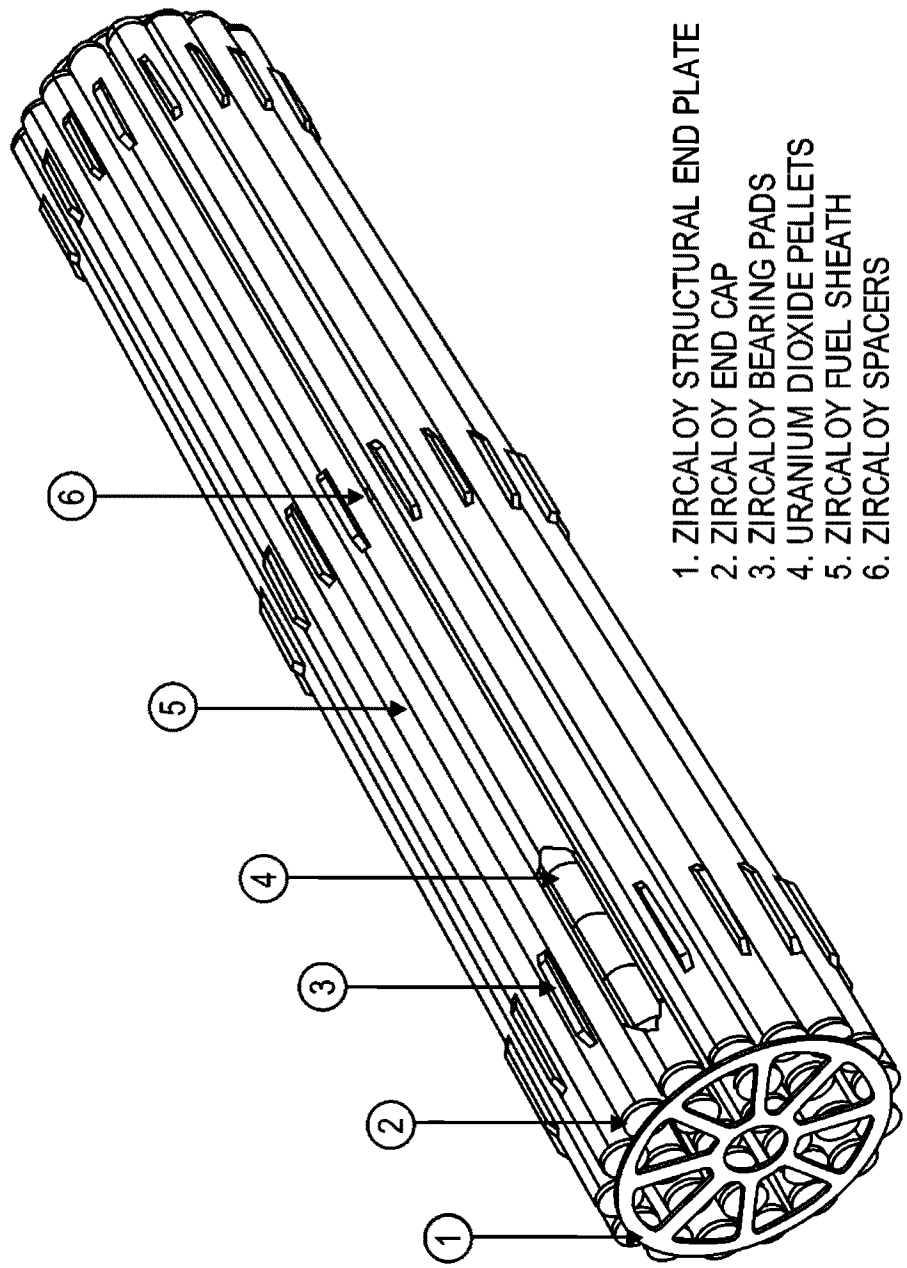
Figure 4:
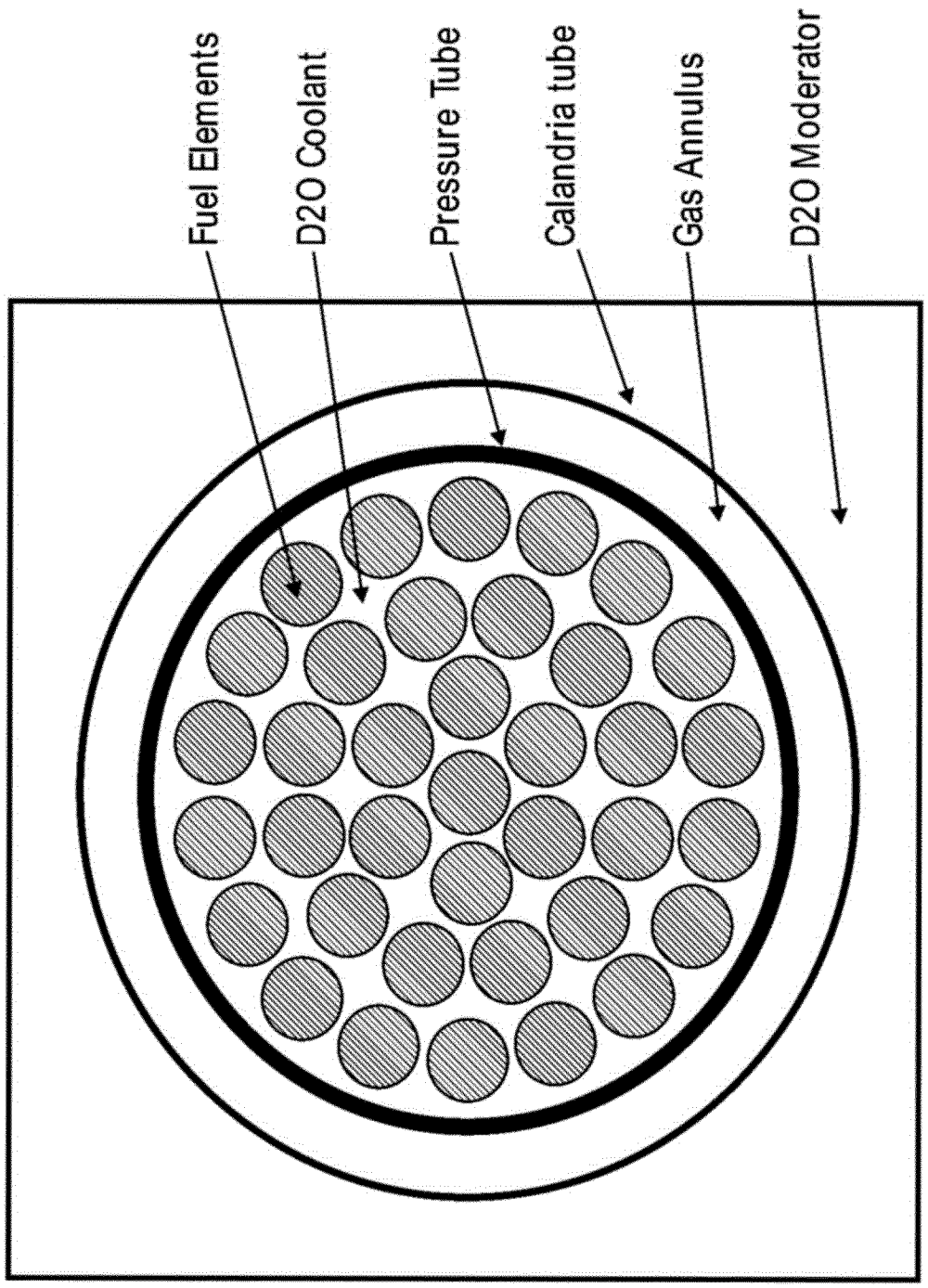
Figure 5A:
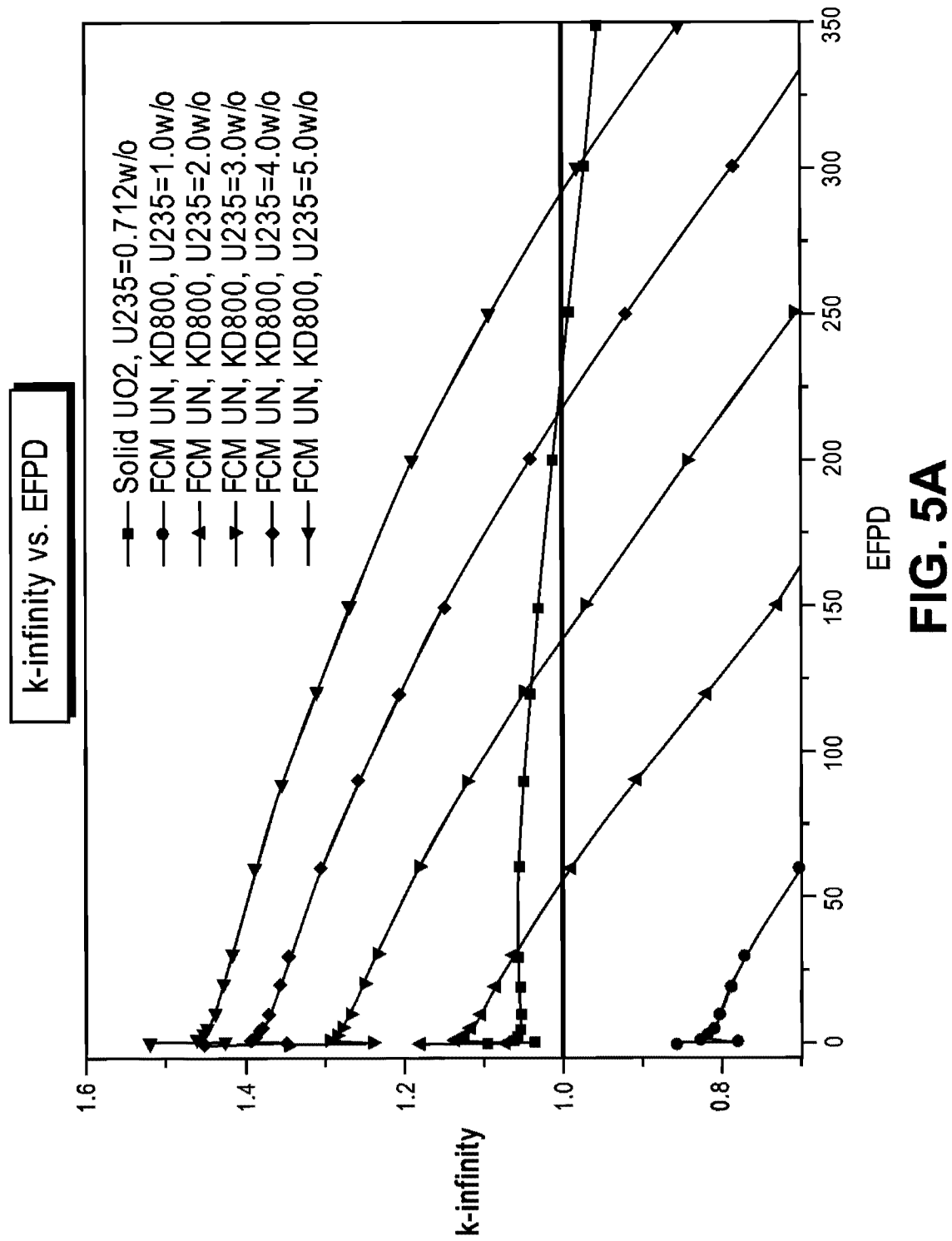
Figure 5B:
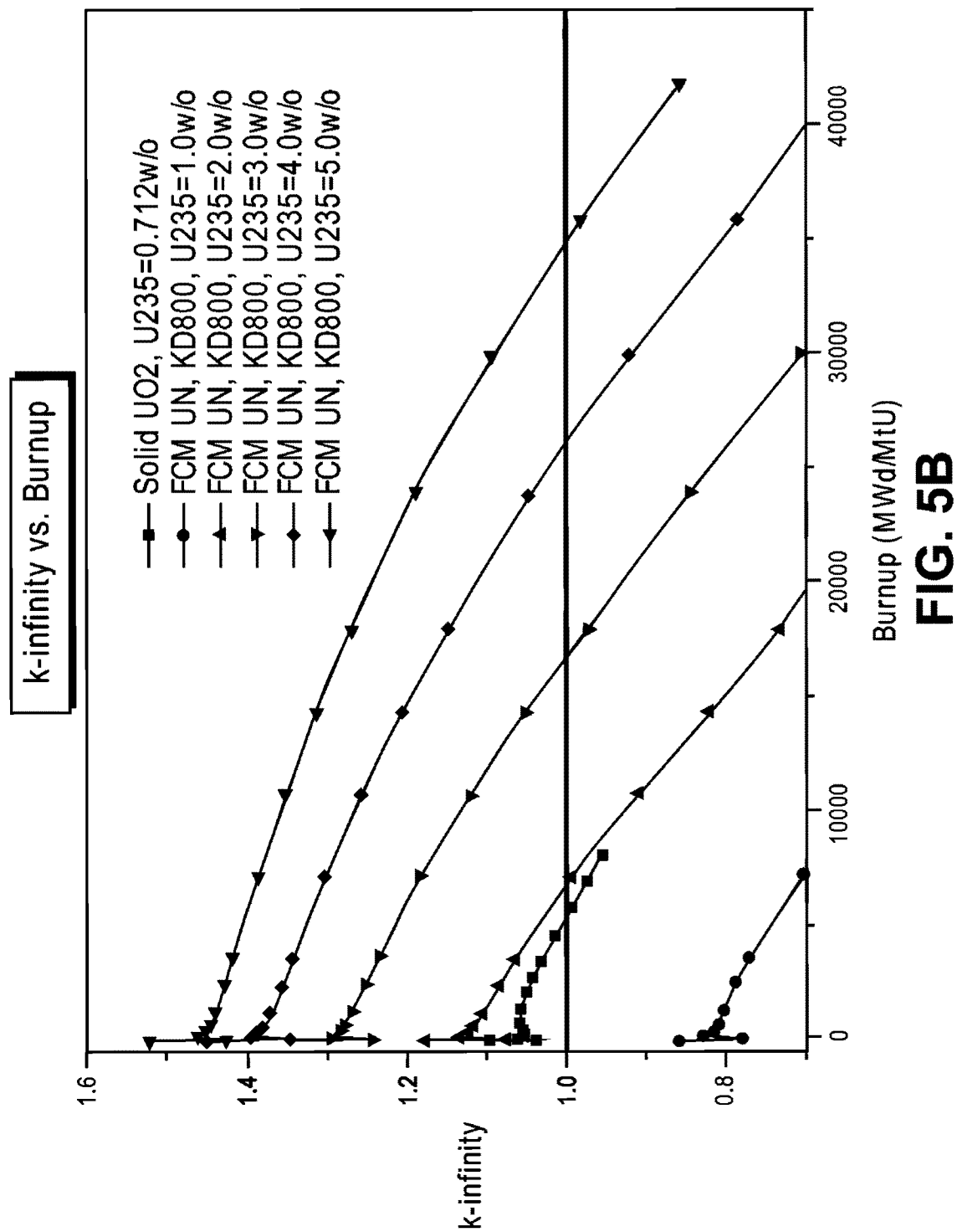

FIG. 13A illustrates the correlation between the multiplication factor and EFPD for the different FCM fuel assemblies, with 5.0 w/o U-235 enrichment, at various concentrations of burnable poisons, and the conventional solid UO2. For example, the k-infinity of the FCM UN fuel with no burnable poisons is very high, at about 1.5; and k-infinity for FCM fuels comprising burnable poisons is comparable to the conventional solid UO2 fuel. FIG. 13B illustrates the correlation between the multiplication factor and burnup for the different FCM fuel assemblies, with 5.0 w/o U-235 enrichment, at various concentrations of burnable poisons, and the conventional solid UO2. FIG. 13B shows the burnup rates of the FCM fuels with 5.0 w/o U-235 enrichment with the burnable poisons $Gd_2O_3$ and $Er_2O_3$, both at various concentrations, are comparable to that of conventional solid UO2 fuel.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A fuel pellet for a nuclear reactor comprising:
   a silicon carbide matrix;
   a plurality of tristructural-isotropic fuel particles embedded in the silicon carbide matrix; and
   two or more burnable poisons;
   wherein:
   the two or more burnable poisons include at least one short-acting burnable poison and at least one long-acting burnable poison;
   the at least one short-acting burnable poison has a larger neutron absorption cross section compared to the at least one long-acting burnable poison; and the at least one short-acting burnable poison includes gadolinium oxide and the at least one long-acting burnable poison includes erbium oxide.

2. The fuel pellet of claim 1, wherein each of the tristructural-isotropic fuel particles is separated from other tristructural-isotropic fuel particles by the silicon carbide matrix.

3. The fuel pellet of claim 1, wherein the two or more burnable poisons further include boron.

4. The fuel pellet of claim 1, further comprising:
fabricated coated particles that include the two or more burnable poisons; and
wherein the fabricated coated particles are mixed with the tristructural-isotropic fuel particles in the silicon carbide matrix.

5. The fuel pellet of claim 4, wherein the fabricated coated particles are bi-structural isotropic particles.

6. The fuel pellet of claim 4, wherein at least one of the fabricated coated particles includes boron.

7. The fuel pellet of claim 1, wherein the two or more burnable poisons are contained in the silicon carbide matrix.

8. The fuel pellet of claim 1, wherein:
each of the tri-structural isotropic fuel particles include:
a fuel kernel; and
four layers of three isotropic materials; and
the four layers of three isotropic materials coat the fuel kernel.

9. The fuel pellet of claim 8, wherein:
the fuel kernel includes uranium nitride (UN), uranium carbide (UC), uranium oxicarbide (UCO), or uranium dioxide (UO2); and
the four layers of three isotropic materials include a porous buffer layer made of carbon, an inner layer of pyrolytic carbon, a ceramic layer, and an outer layer of pyrolytic carbon.

10. The fuel pellet of claim 9, wherein the ceramic layer of each of the tri-structural isotropic fuel particles is formed of silicon carbide.

11. The fuel pellet of claim 10, wherein the ceramic layer formed of silicon carbide of each of the tri-structural isotropic fuel particles includes at least one of the two or more burnable poisons.

\* \* \* \* \*

UNITED STATES PATENT AND TRADEMARK OFFICE
CERTIFICATE OF CORRECTION

PATENT NO. : 10,032,528 B2
APPLICATION NO. : 14/536525
DATED : July 24, 2018
INVENTOR(S) : Francesco Venneri It is certified that error appears in the above-identified patent and that said Letters Patent is hereby corrected as shown below:

On the Title Page

Replace Title Page with attached Title Page.

In the Drawings

Replace Drawing Sheets 1-19 with attached Drawings Sheets 1-19.

Signed and Sealed this
Eighteenth Day of September, 2018

Andrei Iancu
*Director of the United States Patent and Trademark Office*

(12) United States Patent
Venneri

(10) Patent No.: US 10,032,528 B2
(45) Date of Patent: Jul. 24, 2018

(54) FULLY CERAMIC MICRO-ENCAPSULATED (FCM) FUEL FOR CANDUS AND OTHER REACTORS

(71) Applicant: Ultra Safe Nuclear Corporation, Los Alamos, NM (US)

(72) Inventor: Francesco Venneri, Los Alamos, NM (US)

(73) Assignee: Ultra Safe Nuclear Corporation, Los Alamos, NM (US)

(*) Notice: Subject to any disclaimer, the term of this patent is extended or adjusted under 35 U.S.C. 154(b) by 926 days.

(21) Appl. No.: 14/536,525

(22) Filed: Nov. 7, 2014

(65) Prior Publication Data
US 2015/0170767 A1   Jun. 18, 2015

Related U.S. Application Data

(60) Provisional application No. 61/901,289, filed on Nov. 7, 2013.

(51) Int. Cl.
| | |
|---|---|
| *G21C 3/00* | (2006.01) |
| *G21C 3/58* | (2006.01) |
| *G21C 3/04* | (2006.01) |
| *G21C 21/02* | (2006.01) |
| *G21C 3/62* | (2006.01) |
| *G21C 3/64* | (2006.01) |
| *G21C 3/22* | (2006.01) |

(52) U.S. Cl.
CPC ............. *G21C 3/58* (2013.01); *G21C 3/04* (2013.01); *G21C 3/623* (2013.01); *G21C 3/626* (2013.01); *G21C 3/64* (2013.01); *G21C 21/02* (2013.01); *G21C 3/22* (2013.01); *G21C 2003/045* (2013.01); *Y02E 30/38* (2013.01)

(58) Field of Classification Search
CPC ... G21C 3/00; G21C 3/02; G21C 3/04; G21C 2003/045; G21C 2003/047; G21C 2003/048; G21C 3/42; G21C 3/58; G21C 3/62; G21C 3/623; G21C 3/626; G21C 3/64
See application file for complete search history.

(56) References Cited

U.S. PATENT DOCUMENTS

| | | | |
|---|---|---|---|
| 3,992,258 A * | 11/1976 | Tobin ................. | G21C 3/626 264/0.5 |
| 9,299,464 B2 | 3/2016 | Venneri et al. | |
| 9,620,248 B2 | 4/2017 | Venneri | |
| 2013/0077731 A1* | 3/2013 | Sherwood ............ | G21C 3/07 376/417 |

* cited by examiner

*Primary Examiner* — Marshall P O'Connor
(74) *Attorney, Agent, or Firm* — RatnerPrestia

(57) ABSTRACT

A fuel pellet for a nuclear reactor includes a plurality of tristructural-isotropic fuel particles embedded in a structural silicon carbide matrix. A method of manufacturing a fuel pellet includes the steps of coating a plurality of tristructural-isotropic fuel particles with a coating slurry including silicon carbide powder to form a plurality of coated fuel particles; compacting the plurality of fuel particles; and sintering the compacted plurality of fuel particles to form the fuel pellet.

11 Claims, 19 Drawing Sheets

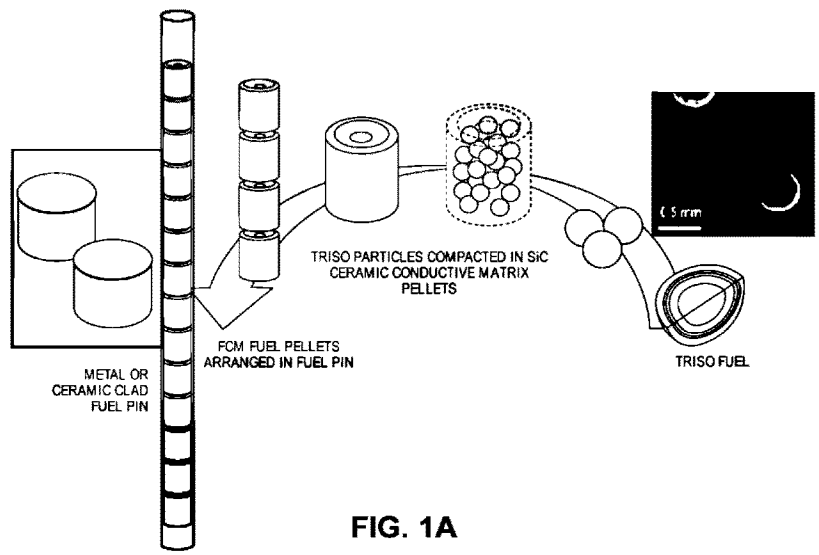

FIG. 1A

1. ZIRCALOY STRUCTURAL END PLATE
2. ZIRCALOY END CAP
3. ZIRCALOY BEARING PADS
4. URANIUM DIOXIDE PELLETS
5. ZIRCALOY FUEL SHEATH
6. ZIRCALOY SPACERS

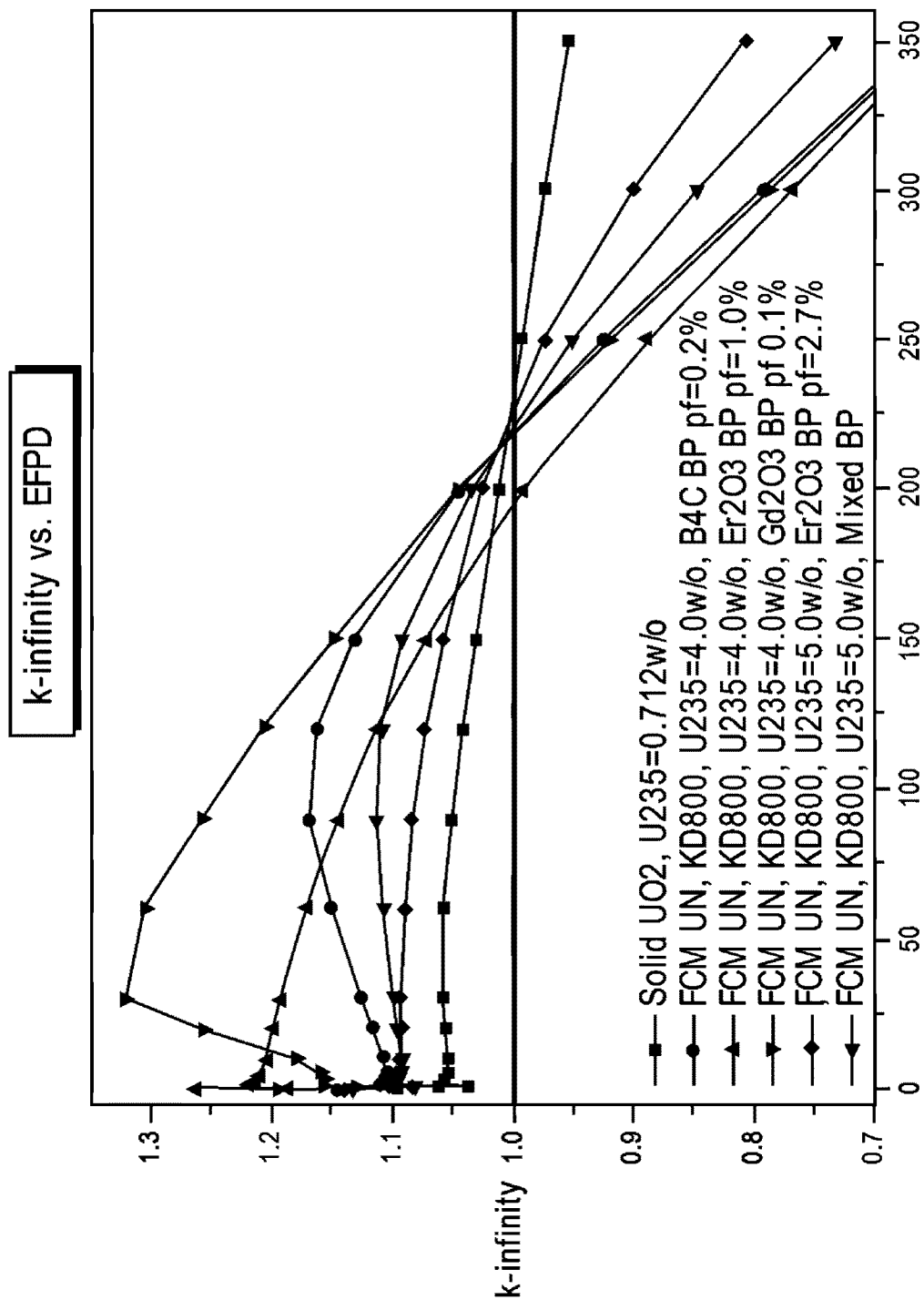

|  | Solid Fuel (0.712w/o) | FCM (4.0w/o) | | FCM (5.0w/o) | |
| --- | --- | --- | --- | --- | --- |
| | | Mass(g) | Ratio(%) | Mass(g) | Ratio(%) |
| U-235 | 0.0763 | 0.1079 | 141.40% | 0.1349 | 176.75% |
| U-238 | 10.6408 | 2.5895 | 24.34% | 2.5625 | 24.08% |
| HM(g)/Rod | 10.7171 | 2.6974 | 25.17% | 2.6974 | 25.17% |

FIG. 10